United States Patent
Hirai

(10) Patent No.: US 10,215,580 B2
(45) Date of Patent: Feb. 26, 2019

(54) ROUTE-GUIDANCE CONTROL DEVICE, ROUTE-GUIDANCE CONTROL METHOD, AND NAVIGATION SYSTEM

(71) Applicant: MITSUBISHI ELECTRIC CORPORATION, Tokyo (JP)

(72) Inventor: Masato Hirai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 101 days.

(21) Appl. No.: 15/122,615

(22) PCT Filed: May 15, 2014

(86) PCT No.: PCT/JP2014/062974
§ 371 (c)(1),
(2) Date: Aug. 30, 2016

(87) PCT Pub. No.: WO2015/173930
PCT Pub. Date: Nov. 19, 2015

(65) Prior Publication Data
US 2017/0074673 A1    Mar. 16, 2017

(51) Int. Cl.
*G01C 21/36* (2006.01)
(52) U.S. Cl.
CPC ..... *G01C 21/3605* (2013.01); *G01C 21/3608* (2013.01); *G01C 21/3676* (2013.01)
(58) Field of Classification Search
CPC ............ G01C 21/3605; G01C 21/3608; G01C 21/3676
See application file for complete search history.

(56) References Cited

U.S. PATENT DOCUMENTS

| | | | | |
|---|---|---|---|---|
| 6,826,472 | B1* | 11/2004 | Kamei | G01C 21/3605 340/995.19 |
| 2006/0253247 | A1* | 11/2006 | de Silva | G01C 21/3611 701/426 |
| 2008/0281513 | A1* | 11/2008 | Sakai | G01C 21/26 701/533 |
| 2008/0312817 | A1* | 12/2008 | Kawauchi | G01C 21/3611 701/533 |
| 2009/0271376 | A1* | 10/2009 | Kawauchi | G06F 17/30985 |
| 2012/0221552 | A1* | 8/2012 | Reponen | G06F 3/04815 707/722 |

(Continued)

FOREIGN PATENT DOCUMENTS

| | | |
|---|---|---|
| JP | 4-72513 A | 3/1992 |
| JP | 2000-57490 A | 2/2000 |

(Continued)

OTHER PUBLICATIONS

Office Action issued in corresponding Chinese Application No. 201480078313.7.

*Primary Examiner* — Mary Cheung
(74) *Attorney, Agent, or Firm* — Birch, Stewart, Kolasch & Birch, LLP

(57) ABSTRACT

A configuration includes: a search unit to access to a map database storing map information to search for a destination corresponding to an input linguistic expression, using a plurality of search criteria provided with orders of priority; and a destination setting unit to set a first destination corresponding to the input linguistic expression, in accordance with the orders of priority.

8 Claims, 24 Drawing Sheets

(56) References Cited

U.S. PATENT DOCUMENTS

2014/0057611 A1* 2/2014 Homma ............. G01C 21/3682
455/414.1

FOREIGN PATENT DOCUMENTS

| JP | 2004-219243 A | 8/2004 |
| JP | 2005-127854 A | 5/2005 |
| JP | 2005-234991 A | 9/2005 |
| JP | 2007-240438 A | 9/2007 |
| JP | 2011-128099 A | 6/2011 |

* cited by examiner

FIG.3

| Order of Priority | Search Criteria of Destination | Location Information to Be Used as Destination | Example | |
|---|---|---|---|---|
| | | | Received Linguistic Expression | Destination |
| 1 | When There Is "Station" Having The Same Name as Input Linguistic Expression | Location Information Indicating "Station" in Map DB | "SHIN-YOKOHAMA" | "SHIN-YOKOHAMA STATION" |
| 2 | When There Is "Name of Prefecture or Municipality" Having The Same Name as Input Linguistic Expression | Location Information Indicating "Government Office" in Map DB | "HAKONE" | "GOVERNMENT OFFICE IN HAKONE TOWN" |
| 3 | When There Is "Name of Facility" Having The Same Name as Input Linguistic Expression | Location Information of "Name of Facility" in Map DB | "YOKOHAMA TOWER" | "YOKOHAMA TOWER" |
| 4 | When There Is "Intersection" Having The Same Name as Input Linguistic Expression | Location Information Indicating "Intersection" in Map DB | "DOGENZAKA" | "DOGENZAKA INTERSECTION" |
| 5 | When There Is "Bridge" Having The Same Name as Input Linguistic Expression | Location Information Indicating "Bridge" in Map DB | "KOMADATE" | "KOMADATE BRIDGE" |
| 6 | When There Is "School" Having The Same Name as Input Linguistic Expression | Location Information Indicating "School" in Map DB | "KASAMA DAINI" | "KASAMA-DAINI JUNIOR HIGH SCHOOL" |
| 7 | When Characters Displayed on Map Include The Same Characters as Input Linguistic Expression | Location Information Indicating Center of Characters Displayed on Map in Map Rendering DB | "MIURA PENINSULA" | Center of Displayed Region of "MIURA PENINSULA" |
| 8 | When There are One or More "Names of Facilities" Including Input Linguistic Expression | Location Information Indicating Distribution of One or More "Names of Facilities" Including Input Linguistic Expression in Map DB | "SHONAN" | Center of Certain Region Where One or More Facilities having the word "SHONAN" Are Mostly Distributed |
| ⋮ | ⋮ | ⋮ | | |

Touch Panel Screen (Display of a List)

Touch Panel Screen (Display on Map)

FIG.7

| Distance Between Current Location and Destination | | Range of Destination's Neighboring Area | |
|---|---|---|---|
| Close | (Example) 1 km | Narrow | (Example) Radius 100 m |
| ↑ | 3 km | ↑ | Radius 300 m |
| | 10 km | | Radius 1 km |
| | 50 km | | Radius 5 km |
| | 100 km | | Radius 10 km |
| | 300 km | | Radius 30 km |
| ↓ | ... | ↓ | ... |
| Far | ... | Wide | ... |

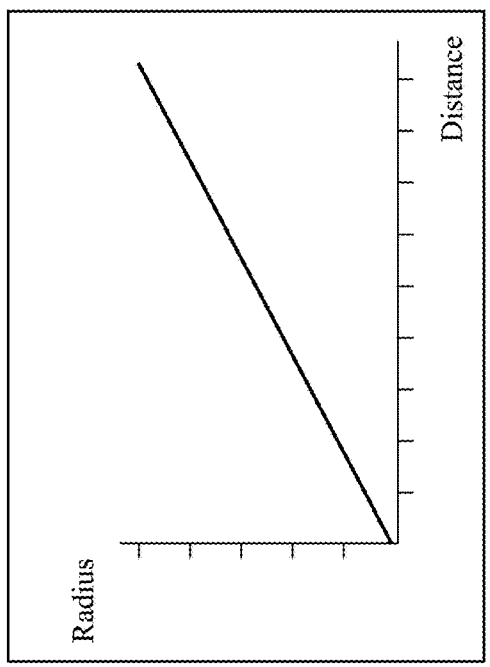
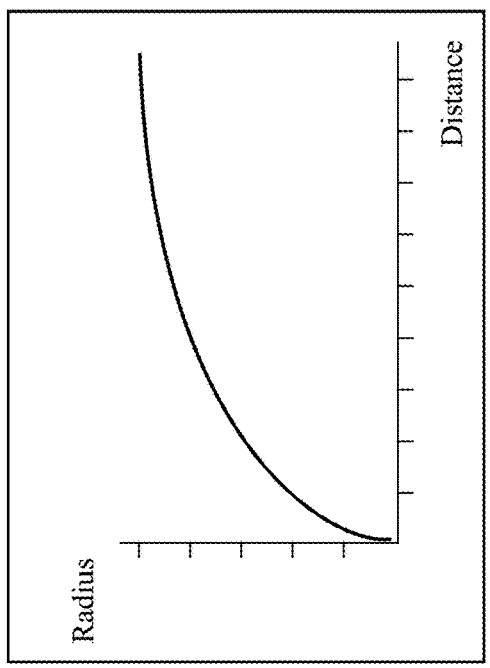
FIG.8

Destination
(Yokohama Station)

Destination's
Neighboring Area:
Narrow Range

Destination
(Yokohama Station)

Destination's
Neighboring Area:
Wide Range

First Destination (Yokohama Station)
First Destination's Neighboring Area
Current Location
Second Destination (Chinatown)
Second Destination's Neighboring Area Touch Panel Screen (Display of a List)

Touch Panel Screen (Display on Map)

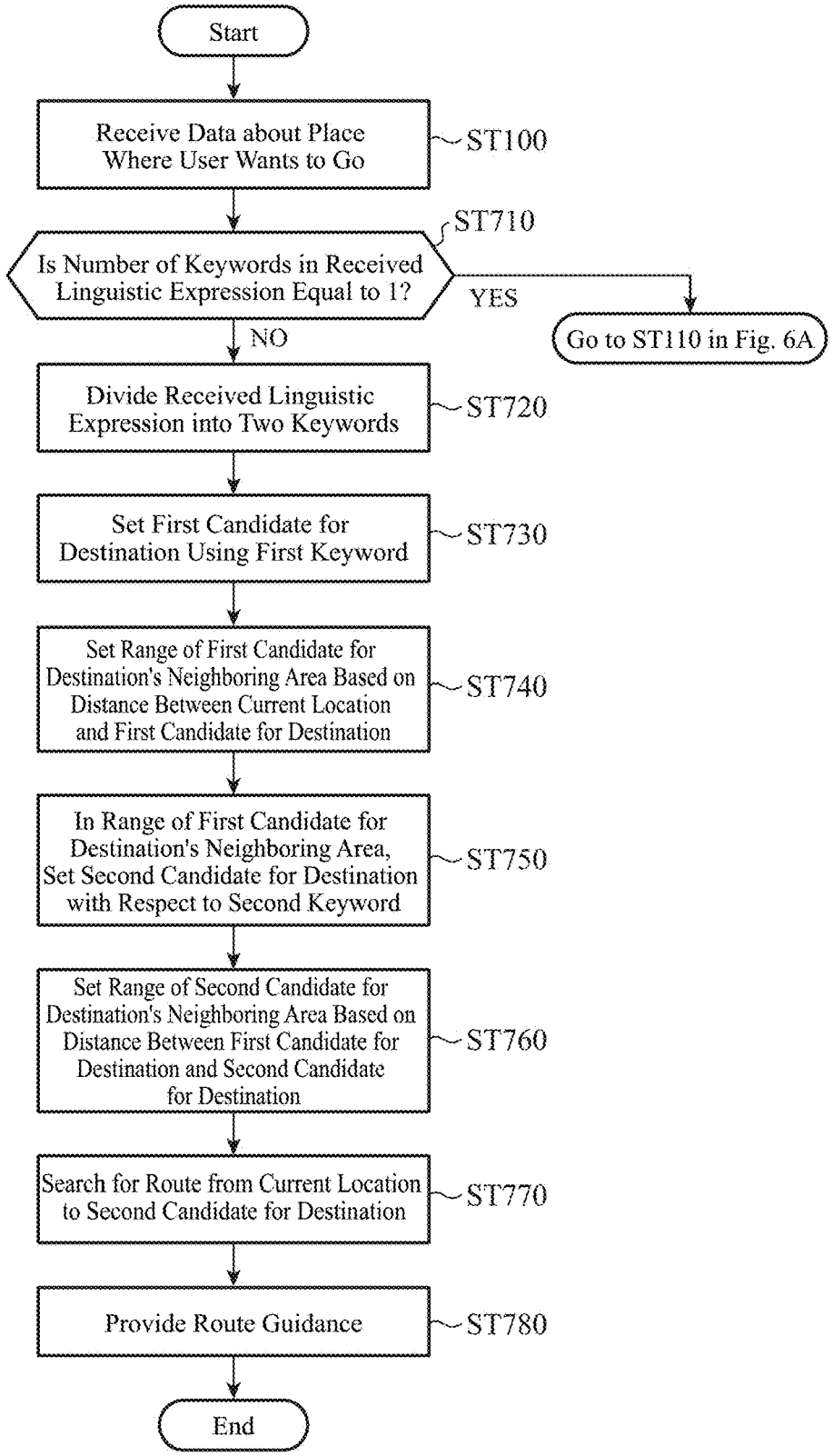

First Candidate for Destination (Yokohama Station)
First Candidate for Destination's Neighboring Area
Current Location
Second Candidate for Destination (Chinatown)
Second Candidate for Destination's Neighboring Area

ROUTE-GUIDANCE CONTROL DEVICE, ROUTE-GUIDANCE CONTROL METHOD, AND NAVIGATION SYSTEM

TECHNICAL FIELD

The invention relates to a route-guidance control device, route guidance method, and navigation system which set a destination area by a vague instruction in route guidance by an automotive navigation system or the like, and then provide route guidance to a final destination as necessary.

BACKGROUND ART

A conventional automotive navigation system sets one specific spot as a destination and computes a route. For methods for setting a specific spot as a destination, there are searches such as a search for the names of facilities, a search for addresses, a search for telephone numbers, and a search for categories of facilities.

However, setting one specific spot as a destination involves a lot of operational steps and also requires operating time. By this, operations take time, thus making it difficult to allow a vehicle to start to run immediately.

To address this issue, for example, there is the configuration as disclosed in Patent Literature 1 which is capable of setting a destination to a predetermined area (region), not to one specific spot, to search for a route, and causing the map of a destination's neighborhood to be displayed on a screen of an automotive navigation system. In Patent Literature 1, the address of a spot being at the center of a display region and a display scale are recognized, an administrative region serving as the destination's neighborhood is recognized based on contrast data, and the route to be followed that has the shortest distance from the current location to an intersection point between a road and an administrative boundary is searched for. When a vehicle has reached near the administrative boundary, guidance is provided to prompt a user to input for a setting as to whether to search for rerouting. A destination neighborhood at the user's destination can be set in the range depending on the degree of user's vagueness about the destination, and, thus, the route to the vague destination can be easily searched for.

In addition, for example, there is a configuration as disclosed in Patent Literature 2 which is capable of building in advance the area data that contains the location coordinates of spots such as primary intersections and the fronts of train stations in each area such as Hakone or Gotemba, and, for the setting of the area name "Hakone" for a destination upon a route search, extracting the location coordinates of spots contained in the target area from the area data to set the extracted location coordinates as the location coordinates of destinations, and, thereafter, searching for routes from the vehicle's current location indicating a starting spot to a plurality of other spots. The configuration carries out an operation of searching for a route using as a destination the closest spot to the starting spot, and allows a display monitor to display the operation result for route guidance.

CITATION LIST

Patent Literatures

Patent Literature 1: Japanese Patent Application Publication No. 2007-240438.

Patent Literature 2: Japanese Patent Application Publication No. 2004-219243.

SUMMARY OF INVENTION

Technical Problem

However, the conventional art as disclosed in Patent Literature 1 requires displaying the map of the destination's neighborhood on a screen. Namely, there is the problem that a route search cannot be performed unless the place on a map where the user wants to go is known.

In addition, in the conventional art as disclosed in Patent Literature 2, there is a need to build the area data in advance, thus causing the problem that a route search cannot be performed for the locations that are not contained in the area data.

The invention is made to solve the above problems, and an object of the invention is to provide a route-guidance control device, route-guidance control method, and navigation system which are capable of performing a route search by a vague instruction that includes nearly human feelings as if a user tells a taxi driver as to where the user wants to go, even without knowing the location on a map where the user wants to go to, or even without the building of area data in advance, and allowing a vehicle to start to run immediately toward the area where the user wants to go to.

Solution to Problem

A route-guidance control device according to the invention includes: a search unit to access to a map database storing map information to search for a destination corresponding to an input linguistic expression, using a plurality of search criteria provided with orders of priority; a destination setting unit to set a first destination corresponding to the input linguistic expression, in accordance with the orders of priority; and a destination's neighboring area setting unit to set a range of a first destination's neighboring area, in accordance with a distance between a current location and the first destination.

A route-guidance control method according to the invention includes the steps of: accessing to a map database storing map information to search for a destination corresponding to an input linguistic expression, using a plurality of search criteria provided with orders of priority, in a search unit; setting a first destination corresponding to the input linguistic expression in accordance with the orders of priority, in a destination setting unit; and setting a range of a first destination's neighboring area, in accordance with a distance between a current location and the first destination, in a destination's neighboring area setting unit.

A navigation system according to the invention is a navigation system in which a route-guidance control device allows a display device to display a route to a destination by using map information stored in a map database. The route-guidance control device includes: a search unit to access to a map database storing map information to search for a destination corresponding to an input linguistic expression, using a plurality of search criteria provided with orders of priority; a destination setting unit to set a first destination corresponding to the input linguistic expression, in accordance with the orders of priority; and a destination's neighboring area setting unit to set a range of a first destination's neighboring area, in accordance with a distance between a current location and the first destination.

Advantageous Effects of Invention

According to the invention, it is possible to perform the route search by a vague instruction and, thus, a vehicle can start to run immediately toward the area where a user wants to go to. Further, burdens on the number of operations and operating times for a route search can be reduced. Furthermore, without the building of area data in advance, the route search can be performed by an area name.

BRIEF DESCRIPTION OF DRAWINGS

FIG. 3 is a diagram showing examples of a plurality of search criteria to be used when a destination setting unit sets a destination.

FIG. 7 is a diagram showing examples of conditions for setting a range of a destination's neighboring area in a destination's neighboring area setting unit.

FIG. 8 is a diagram showing other examples of conditions for setting a range of a destination's neighboring area in the destination's neighboring area setting unit.

FIG. 18 is a flowchart for describing the operation of the route-guidance control device according to the fourth embodiment of the invention.

DESCRIPTION OF EMBODIMENTS

Embodiments of the invention will be described in detail below with reference to the drawings.

First Embodiment

Figure 1:
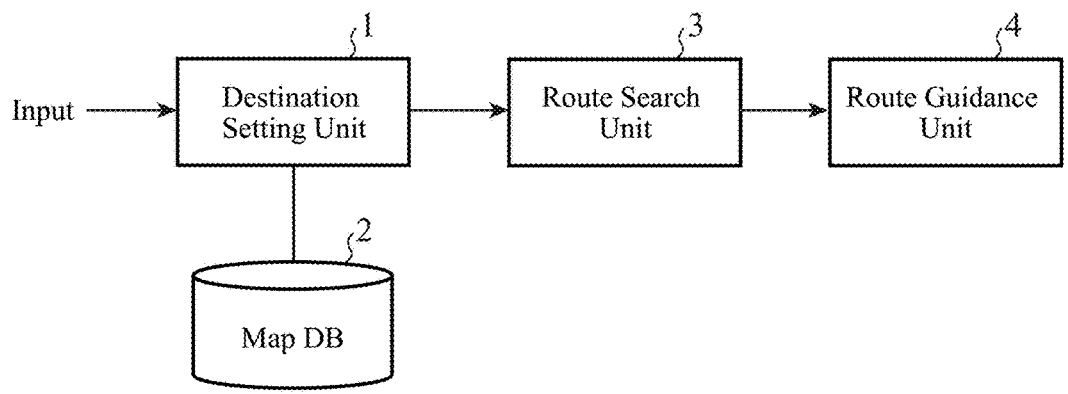
FIG. 1 is a configuration diagram of a route-guidance control device according to a first embodiment of the invention.

FIG. 1 is a configuration diagram of a route-guidance control device according to a first embodiment of the invention.

The route-guidance control device includes a destination setting unit 1, a map database (hereinafter, referred to as a map DB) 2, a route search unit 3, and a route guidance unit 4.

The destination setting unit 1 includes a search unit that searches for a destination for each of a plurality of search criteria, and can set a destination based on the search results obtained using a plurality of predetermined search criteria and based on data about a linguistic expression input by voice or text from an input device (not shown). Specifically, when the map DB 2 does not include a linguistic expression that matches an input linguistic expression, the destination setting unit 1 sets, as will be described below, for example, a temporary destination using map information that includes the input linguistic expression. Orders of priority are set for the plurality of search criteria, and the destination setting unit 1 sets a destination such that a high-priority search criterion has precedence.

The map DB 2 contains map-related data (map information) such as the names of facilities and/or the location information of facilities.

The route search unit 3 performs a route search to search for a route from a current location to the destination.

The route guidance unit 4 provides route guidance based on the result of the route search performed by the route search unit 3.

The operation of the route-guidance control device according to the first embodiment of the invention will be described.

Figure 2:
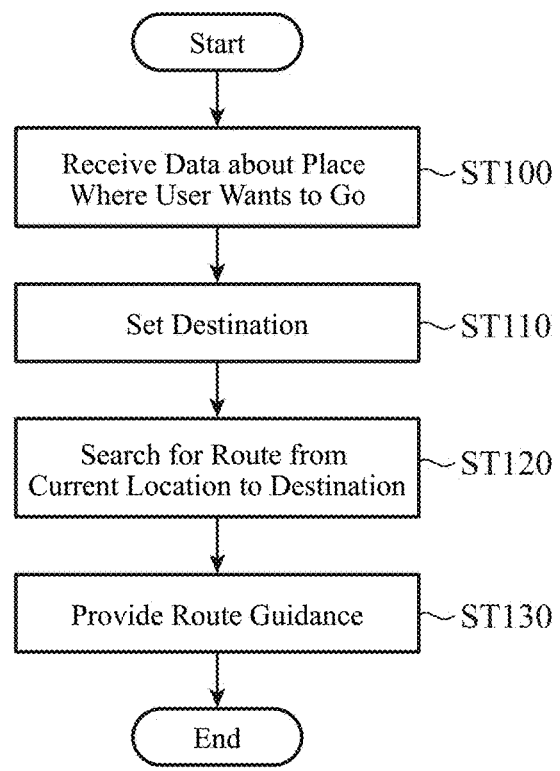
FIG. 2 is a flowchart for describing the operation of the route-guidance control device according to the first embodiment of the invention.

FIG. 2 is a flowchart for describing the operation of the route-guidance control device according to the first embodiment of the invention.

The destination setting unit 1 receives data about a linguistic expression input from the input device, i.e., data about where a user wants to go (step ST100). In this regard, the user's inputting of the place where the user wants to go can be completed by a voice recognition, the inputting of a text, or the like, and the inputting can be made by any means. At that time, for example, the input device may generate an audio output such as "Where do you go for the moment?" or "Which area do you go?" to ask the user a question. This can prompt or induce the user to input a vague linguistic expression or the name of an area. Further, "Where do you go for the moment?", "Which area do you go?" or other message can be displayed in a screen. A combination of an audio output and a screen display can be performed.

The destination setting unit 1 sets a destination based on the search results obtained by using a plurality of preset search criteria in accordance with the data received at step ST100, i.e., the data about the linguistic expression input by the user (step ST110). At that time, the data contained in the map DB 2, such as facility information and/or the location information of facilities, is used.

FIG. 3 is a diagram showing examples of a plurality of search criteria to be used when the destination setting unit 1 sets a destination.

As shown in FIG. 3, orders of priority are set for the plurality of search criteria, and in FIG. 3 the search criteria are assigned the orders of priority: 1, 2, . . . , in descending order of priority.

The destination setting unit 1 sets a destination by performing a search for each of the plurality of search criteria such as those shown in FIG. 3. Location information indicating the determined destination is obtained from the map DB 2.

For example, when a linguistic expression input by the user is "Shin-Yokohama", since there is a "station" having the same name as the input linguistic expression, the destination setting unit 1 obtains location information indicating "Shin-Yokohama Station" from the map DB and sets the location information as a destination. When a linguistic expression input by the user is "Hakone", although there is no "station" having the same name as the input linguistic expression, i.e., "Hakone Station", since there is the "name of prefecture or municipality" having the same name as the input linguistic expression, the destination setting unit 1 obtains location information indicating "Hakone Town Hall" from the map DB and sets the location information as a destination. In the case where a linguistic expression input by the user is "Yokohama Tower", although there is no "station" or "name of prefecture or municipality" having the same name as the input linguistic expression such as "Yokohama Tower Station" or "Yokohama Tower Prefecture", there is a "name of facility" having the same name as the input linguistic expression. In this case, the destination setting unit 1 obtains location information indicating "Yokohama Tower" from the map DB 2 and sets the location information as it is as a destination spot. In the case where a linguistic expression input by the user is "Dogenzaka", although there is no "station", "name of prefecture or municipality", or "name of facility" which has the same name as the input linguistic expression such as "Dogenzaka Station", "Dogenzaka Prefecture" or "Dogenzaka", there is an "intersection" having the same name as the input linguistic expression. In this case, the destination setting unit 1 obtains location information indicating "Dogenzaka Intersection" from the map DB and sets the location information as a destination.

As such, it is determined which location information should be treated as a destination in accordance with an input linguistic expression.

In this regard, since the orders of priority are set for the plurality of search criteria, the destination setting unit 1 may perform a search in descending order of priority and terminate the search when a destination is found. Alternatively, the destination setting unit 1 may perform a search for all of the plurality of search criteria, and, when a plurality of destinations are set, the destination setting unit 1 may set one of the candidates that matches a high-priority search criterion, as a destination. For example, when, as the result of a destination search for each of the plurality of search criteria of FIG. 3, an input linguistic expression is included in both a station name and a name of municipality, the destination setting unit 1 sets the station name as a destination. Specifically, for example, when "Yokohama" is input, "Yokohama Station" rather than "Yokohama City Hall" is set as a destination.

The plurality of search criteria are not limited to those shown in FIG. 3 and can be set as appropriate.

The route search unit 3 performs a route search for a route from the current location to the destination (step ST120). The route search may be performed using existing techniques.

The route guidance unit 4 provides route guidance in accordance with the route set by the route search unit 3 at step ST120 (step ST130). The route guidance may be provided using existing techniques.

Figure 4A:
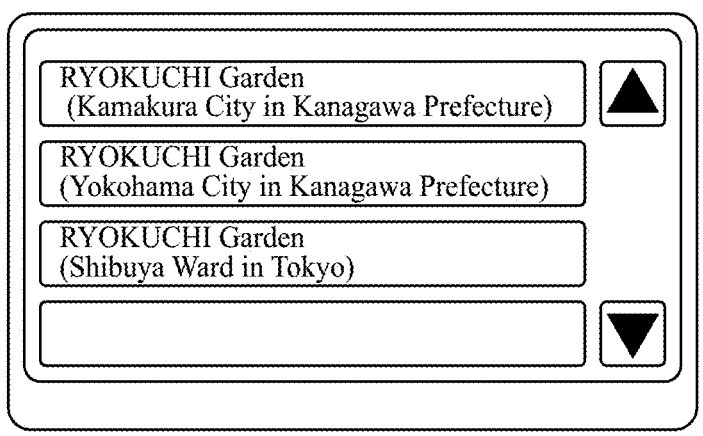
FIGS. 4A and 4B are diagrams illustrating examples of presenting candidates for destinations to a user.
Figure 4B:
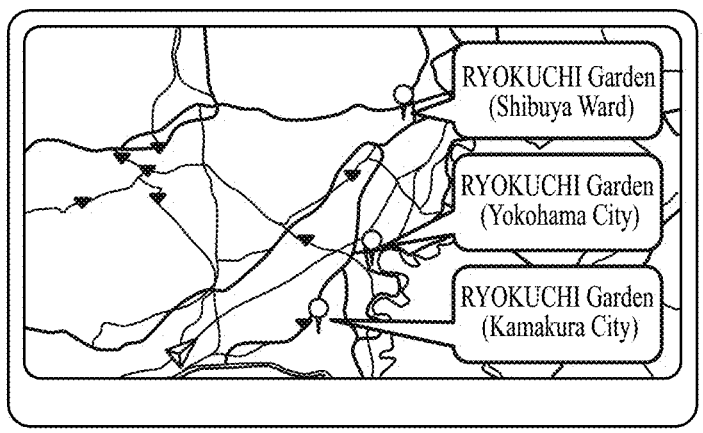

When, upon the setting of destinations by the destination setting unit 1 at step ST110, a plurality of destinations with the same name can be set, it is also possible to present candidates to the user so as to prevent a user's unintended destination from being automatically set. Specifically, for example, when the destination "Ryokuchi Koen" that exists at Kamakura City in Kanagawa Prefecture, at Yokohama City in Kanagawa Prefecture, and at Shibuya Ward in Tokyo can be set, as shown in FIG. 4A, the candidates for "Ryokuchi Koen" that are possibly destinations can be displayed in a list on a touch panel screen of a display device (not shown). In addition, as shown in FIG. 4B, a map may be displayed on the touch panel screen of the display device (not shown). By doing so, the user can check the candidates for a destination on the screen and determine a destination, and accordingly, a user's unintended destination can be prevented from being automatically set.

In addition to the presentation methods shown in FIGS. 4A and 4B, for example, candidates for a destination may be displayed on a screen and the user may decide a destination using a hardware selection button installed on a steering wheel or the like. Alternatively, for example, the sentence for checking ""Ryokuchi Koen" in Kamakura? In Yokohama? In Shibuya?" or ""Ryokuchi Koen" in Kamakura?" may be output by voice guidance, and the user may answer a message such as "Kamakura" or "Yokohama" by voice. As such, a method for presenting a plurality of candidates for a destination to the user can be selected as appropriate.

As described above, according to the first embodiment, even if an input linguistic expression is vague, a destination can be set. Further, even without preparing in advance, for example, destination data associated with areas, a destination can be set. In addition, burdens on the number of operations and operating time for a route search can be further reduced.

Second Embodiment

In the first embodiment, the embodiment has been described in which even if an input linguistic expression is vague, a destination can be set. Alternatively, since a user's vague instruction for a destination includes a nuance such as "XX area", "direction of XX", or "around XX", there is the possibility that a destination may differ from the spot where a user wants to go. Hence, it may be appropriate that the location where the user wants to go be taken as an area having a two-dimensional area and the area be narrowed step by step to thereby become an accurate destination.

In the second embodiment, an embodiment will be described in which an area of a user's intended location where the user wants to go (destination's neighboring area) is set and a range (extent) of the destination's neighboring area is variably made depending on a distance between a current location and a destination, and, for example, when the user has approached near the boundary of the destination's neighboring area, the destination is reset and the area where the user should travel to is further narrowed.

Figure 5:
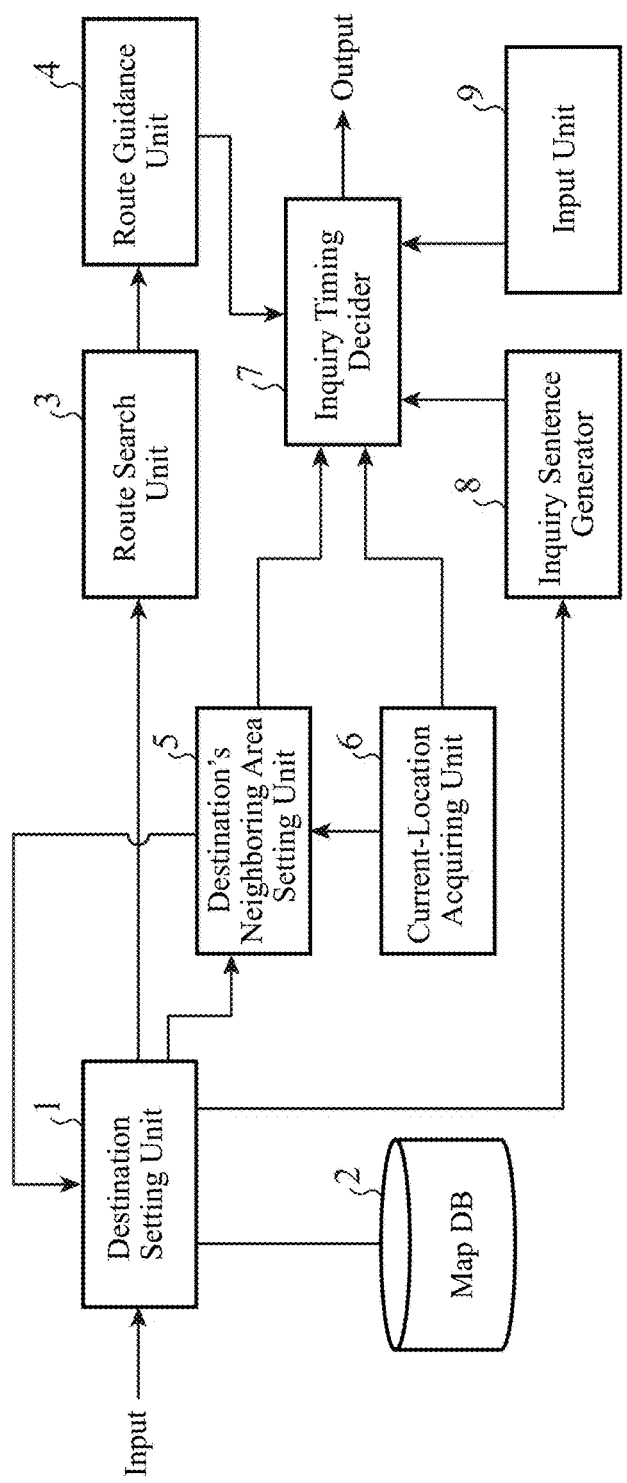
FIG. 5 is a configuration diagram of a route-guidance control device according to a second embodiment of the invention.

FIG. 5 is a configuration diagram of a route-guidance control device according to the second embodiment of the invention.

Note that overlapping descriptions of the same configurations as those described with respect to FIG. 1 in the first embodiment will be omitted.

The difference between the second embodiment and the first embodiment is, as shown in FIG. 5, that the device further includes a destination's neighboring area setting unit 5, a current-location acquiring unit 6, an inquiry timing decider 7, an inquiry sentence generator 8, and an input unit 9.

The destination's neighboring area setting unit 5 calculates, based on a destination received from a destination setting unit 1 and location information indicating a current location received from the current-location acquiring unit 6, the distance between the current location and the destination, and sets a destination's neighboring area based on the calculated distance between the current location and the destination.

The current-location acquiring unit 6 acquires the location information indicating the current location by GPS or the like.

The inquiry sentence generator 8 receives data about a linguistic expression input last time from the destination setting unit 1 and generates a sentence of inquiry to ask the user.

The inquiry timing decider 7 receives the current location from the current-location acquiring unit 6 and receives a range of the destination's neighboring area from the destination's neighboring area setting unit 5. When inquiry timing comes, the inquiry timing decider 7 voice-outputs or display-outputs the inquiry sentence generated by the inquiry sentence generator 8.

The input unit 9 is a hardware button such as a button on a touch panel screen that receives user's instructions. The input unit 9 may be included in the route-guidance control device or may be provided external to the route-guidance control device.

Figure 6A:
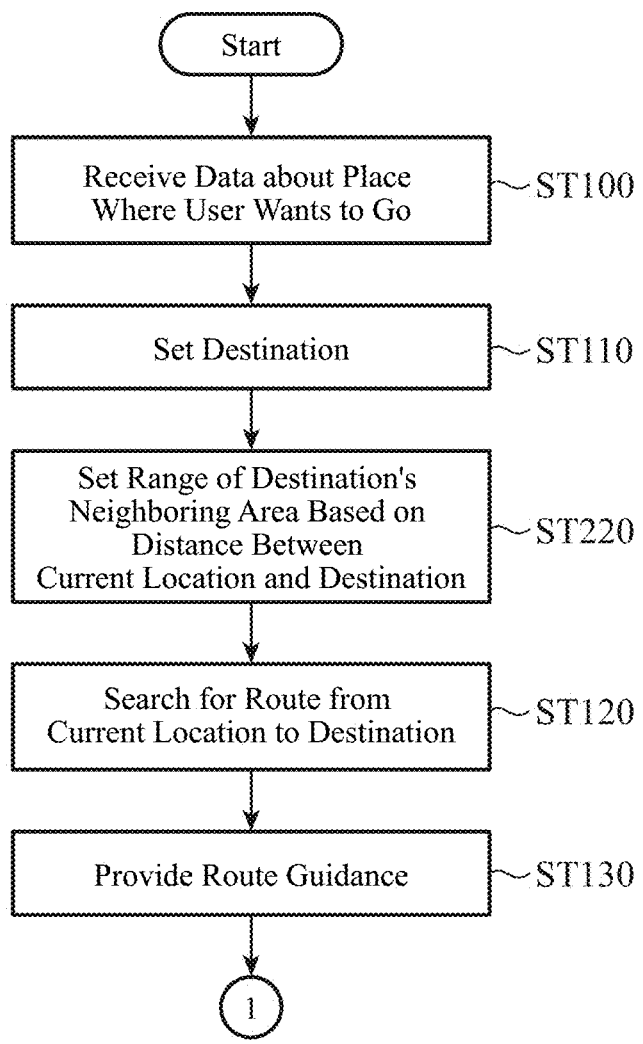
FIG. 6A is a flowchart for describing the operation of the route-guidance control device according to the second embodiment of the invention.
Figure 6B:
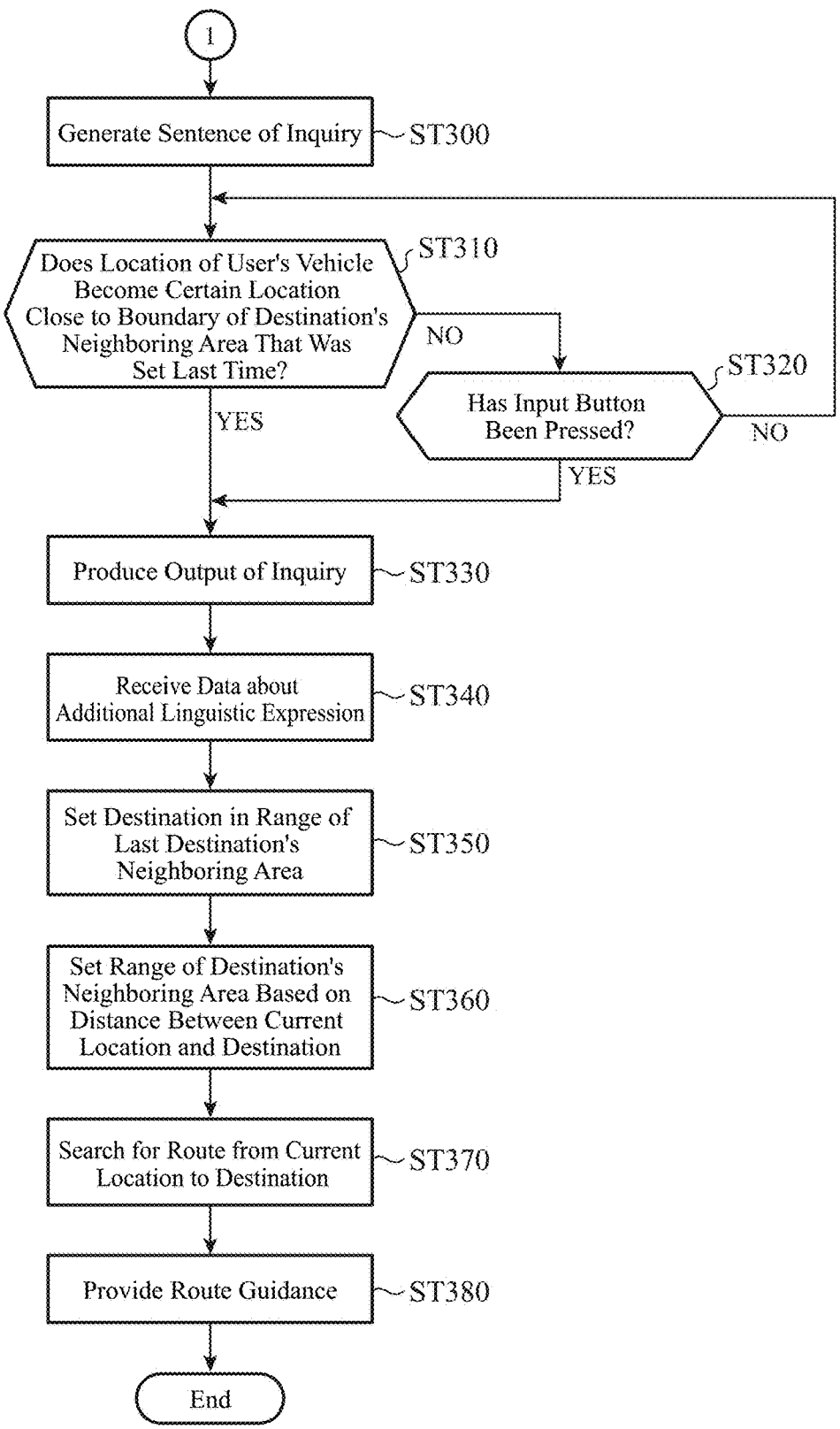
FIG. 6B is a flowchart for describing the operation of the route-guidance control device according to the second embodiment of the invention.

FIGS. 6A and 6B are flowcharts for describing the operation of the route-guidance control device according to the second embodiment of the invention. With reference to FIGS. 6A and 6B, the operation will be described.

Since steps ST100, ST110, ST120, and ST130 in FIG. 6A have the same operation as steps ST100, ST110, ST120, and ST130 shown in FIG. 2 in the first embodiment, respectively, the overlapping descriptions will be omitted. It is assumed that a destination is set using the plurality of search criteria of FIG. 3.

The destination's neighboring area setting unit 5 receives location information indicating a destination (hereinafter, referred to as a first destination) that is set by the destination setting unit 1 at step ST110 as well as location information indicating a current location obtained by the current-location acquiring unit 6, and computes a distance between the current location and the first destination, based on the two pieces of received location information. In this regard, the distance as used herein includes a straight-line distance and journey information.

Furthermore, the destination's neighboring area setting unit 5 sets a range (extent) of a destination's neighboring area (hereinafter, referred to as a first destination's neighboring area), based on the computed distance between the current location and the first destination (step ST220).

A specific method for setting a range of a destination's neighboring area will be described.

FIG. 7 is a diagram showing examples of conditions for setting a range of a destination's neighboring area in the destination's neighboring area setting unit 5.

Under conditions such as those shown in FIG. 7, the destination's neighboring area setting unit 5 sets a range of a destination's neighboring area in accordance with a distance between a current location and a destination. For example, when the distance between the current location and the destination is 1 km, the destination's neighboring area setting unit 5 sets a range of a destination's neighboring area to a radius of 100 m. In this regard, the conditions for setting a range of a destination's neighboring area can be set as appropriate and are stored in advance in the destination's neighboring area setting unit 5.

FIG. 8 is a diagram showing other examples of conditions for setting a range of a destination's neighboring area in the destination's neighboring area setting unit 5.

As shown in FIG. 8, the destination's neighboring area setting unit 5 may store the graph that defines relationship between a distance between a current location and a destination and a radius of a destination's neighboring area, or may store data that defines relationship as a mathematical expression. As such, how to define the conditions for determining a range of a destination's neighboring area is not particularly limited.

Figure 9A:
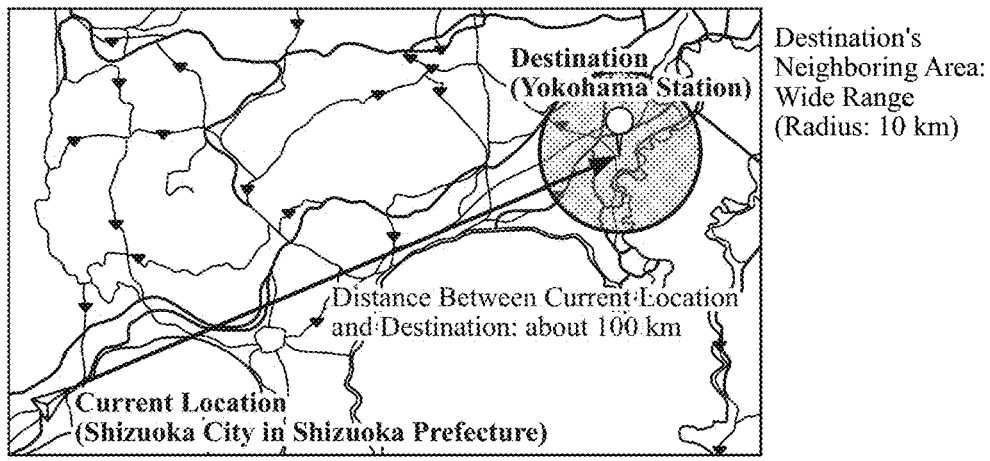
FIGS. 9A to 9C illustrate examples of specific images showing distances between a destination and current locations, and showing destination's neighboring areas on a map.
Figure 9B:
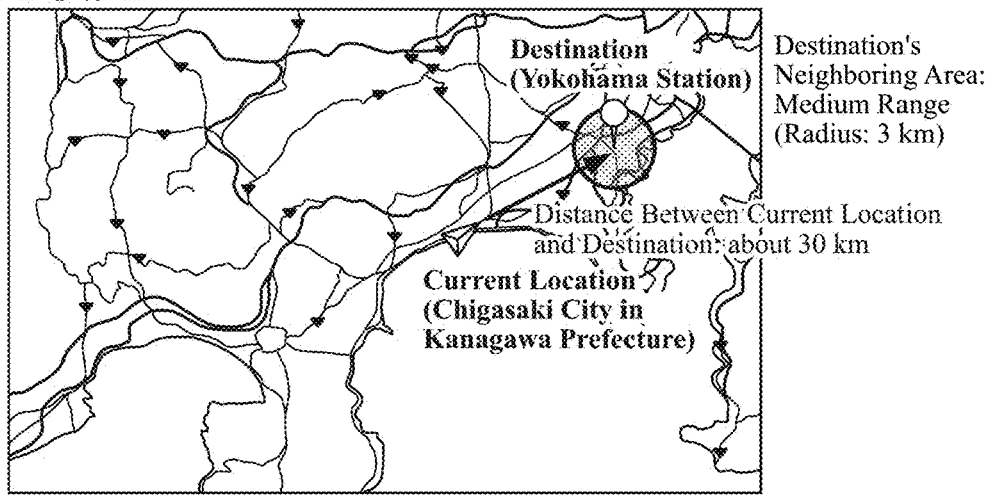
Figure 9C:
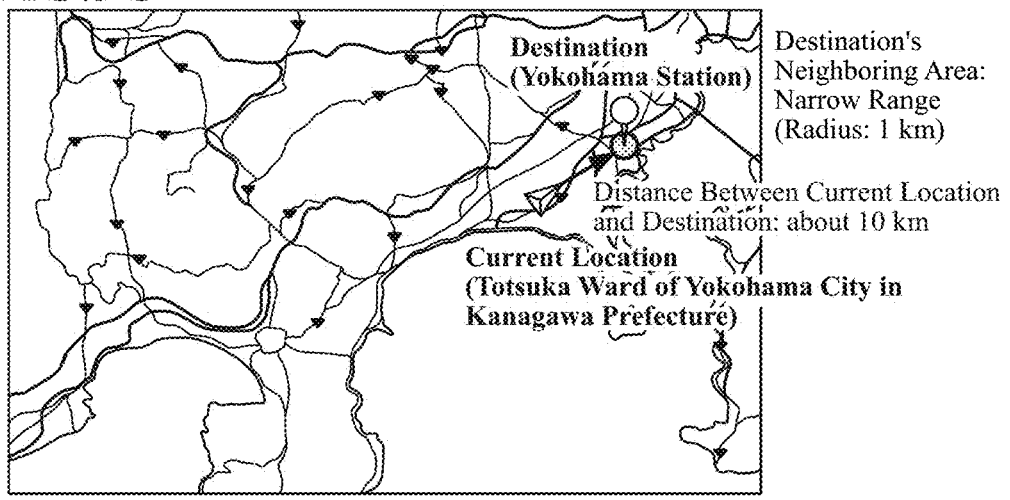

FIGS. 9A to 9C illustrate examples of specific images showing the distances between destinations and current locations, and showing destination's neighboring areas on a map.

For example, when an input linguistic expression is "Yokohama", the destination setting unit 1 uses location information indicating "Yokohama Station" as a destination. When, as shown in FIG. 9A, a current location is Shizuoka City, Shizuoka Prefecture, since the distance between the current location and Yokohama Station is about 100 km, the destination's neighboring area setting unit 5 sets the radius of a destination's neighboring area having Yokohama Station at the center to 10 km. In addition, when, as shown in FIG. 9B, a current location is Chigasaki City in Kanagawa Prefecture, since the distance between the current location and Yokohama Station is about 30 km, the destination's neighboring area setting unit 5 sets the radius of a destination's neighboring area having Yokohama Station at the center to 3 km. In addition, when, as shown in FIG. 9C, a current location is Totsuka Ward, Kanagawa Prefecture, since the distance between the current location and Yokohama Station is about 10 km, the destination's neighboring area setting unit 5 sets the radius of a destination's neighboring area having Yokohama Station at the center to 1 km.

As such, when the destination is far from the current location, the destination's neighboring area is wide, and when the destination is close to the current location, the destination's neighboring area is narrow.

Note that here the destination's neighboring area is circular, but is not limited to a circular shape and may be oval or square, or may be a prefecture or a city. The shape of the destination's neighboring area may be arbitrary.

In addition, the destination setting unit 1 may store data as to which search criterion is used to set a destination when the destination is set, i.e., data indicating the degree of match between an input linguistic expression and the set destination. The destination's neighboring area setting unit 5 may set the size of a destination's neighboring area, according to which the search criterion is used to set the destination to be stored in the destination setting unit 1. For example, when an input linguistic expression is the same as the name of a facility or the name of an intersection, a destination's neighboring area may be set to be narrow. When the name of any facility, intersection or other location that is the same as the input linguistic expression does not exist and a destination is set using location information indicating a station or a government office, the destination's neighboring area may be set to be wide.

This will be described referring to FIGS. 10A and 10B.

Figure 10A:
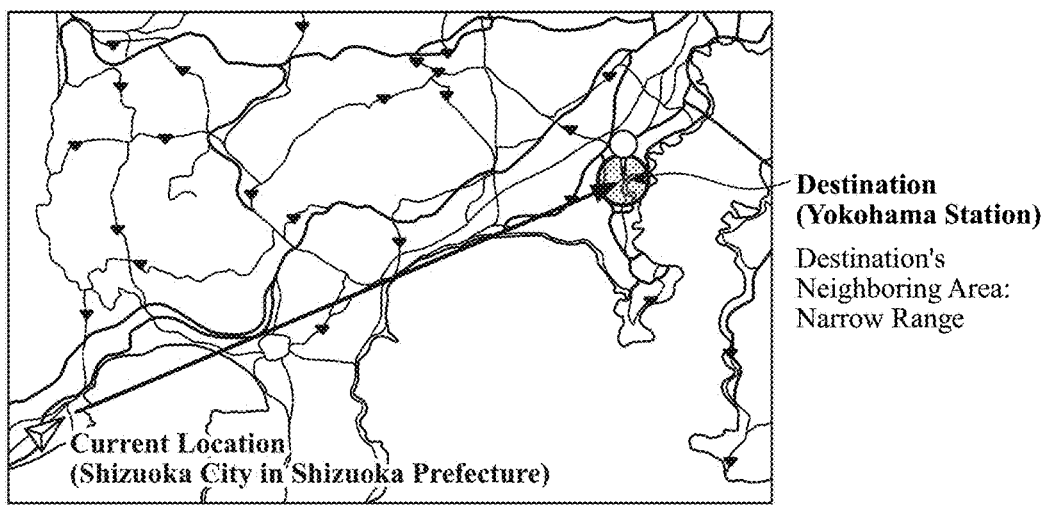
FIGS. 10A and 10B are diagrams illustrating examples for adjusting a range of a destination's neighboring area by an input linguistic expression.

FIG. 10A is a diagram illustrating an example of a range of a destination's neighboring area for a case of the input "Yokohama Station".

Figure 10B:
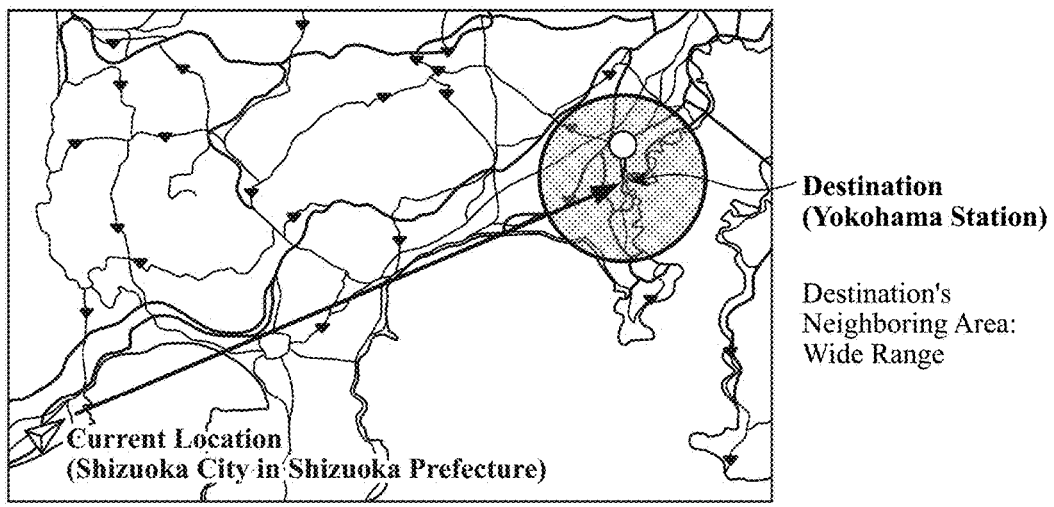

FIG. 10B is a diagram illustrating an example of a range of a destination's neighboring area for a case of the input "Yokohama".

For example, in both of the case of the input "Yokohama Station" as shown in FIG. 10A and the case of the input "Yokohama" as shown in FIG. 10B, the destination setting unit 1 sets the same "Yokohama Station" as a destination. On the other hand, in the case of the input "Yokohama Station", the name of facility "Yokohama Station" exists in the map DB 2 and thus there is matching location information, whereas in the case of the input "Yokohama", there is no matching location information in the map DB 2 and thus a destination is set based on location information indicating a station name. That is, it can be said that the case of the input "Yokohama Station" is more likely that the destination is a location where the user wants to go. Hence, the destination's neighboring area setting unit 5 stores the conditions such that a narrow destination's neighboring area is set for the case of the input "Yokohama Station", as shown in FIG. 10A, and a wide destination's neighboring area is set for the case of the input "Yokohama", as shown in FIG. 10B, and sets a destination's neighboring area based on the conditions. In this way, the range of an area can be approximated to the one expected by the user.

The description returns to the flow of FIG. 6A.

Figure 11:
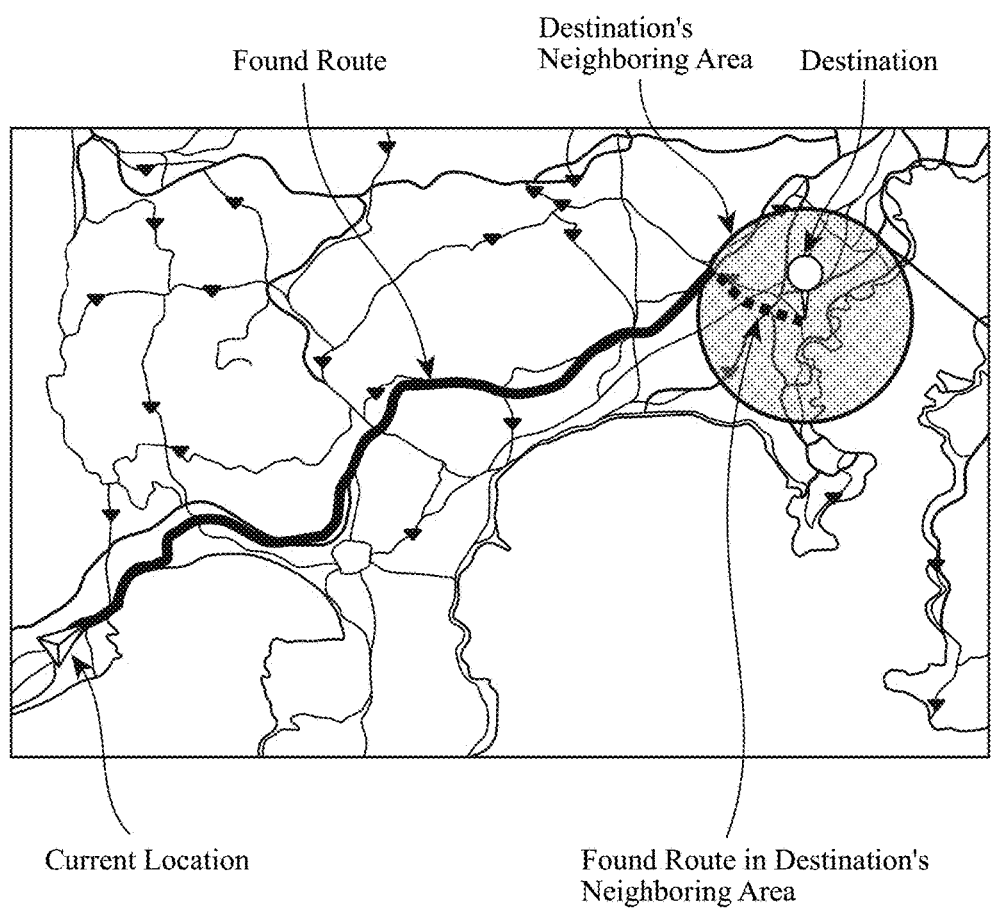
FIG. 11 is a diagram showing an example of a screen display of a destination's neighboring area.

After a route search unit 3 searches for a route at step ST120, a route guidance unit 4 provides route guidance at step ST130. At this time, the destination's neighboring area setting unit 5 may transmit a signal for displaying the first destination's neighboring area set at step ST220, to a display device (not shown) for a screen display (see FIG. 11). Note that display may be performed such that, as shown by a dotted line and a solid line in FIG. 11, the user can see a search route in a destination's neighboring area and a search route from a current location to where the user has approached the destination's neighboring area. Note also that the display device may be included in the route-guidance control device or may be provided external to the route-guidance control device.

The inquiry sentence generator 8 generates a sentence of inquiry (step ST300). Specifically, the destination setting unit 1 has stored a linguistic expression input last time (data received at step ST100), and the inquiry sentence generator 8 receives the data about the linguistic expression input last time from the destination setting unit 1, and generates an inquiry sentence based on the received data about the linguistic expression. For example, when the destination setting unit 1 receives "Yokohama" at step ST100, the inquiry sentence generator 8 generates an inquiry sentence such as "Where in Yokohama do you go?" or "Where in Yokohama?". Alternatively, for example, when the destination setting unit 1 receives "Yokohama Station" at step ST100, the inquiry sentence generator 8 generates an inquiry sentence such as "Whereabouts in Yokohama Station?". Note that the inquiry sentences are not limited thereto and may be arbitrary as long as the content of an inquiry sentence allows to obtain an answer by which the area can be further narrowed.

Figure 12:
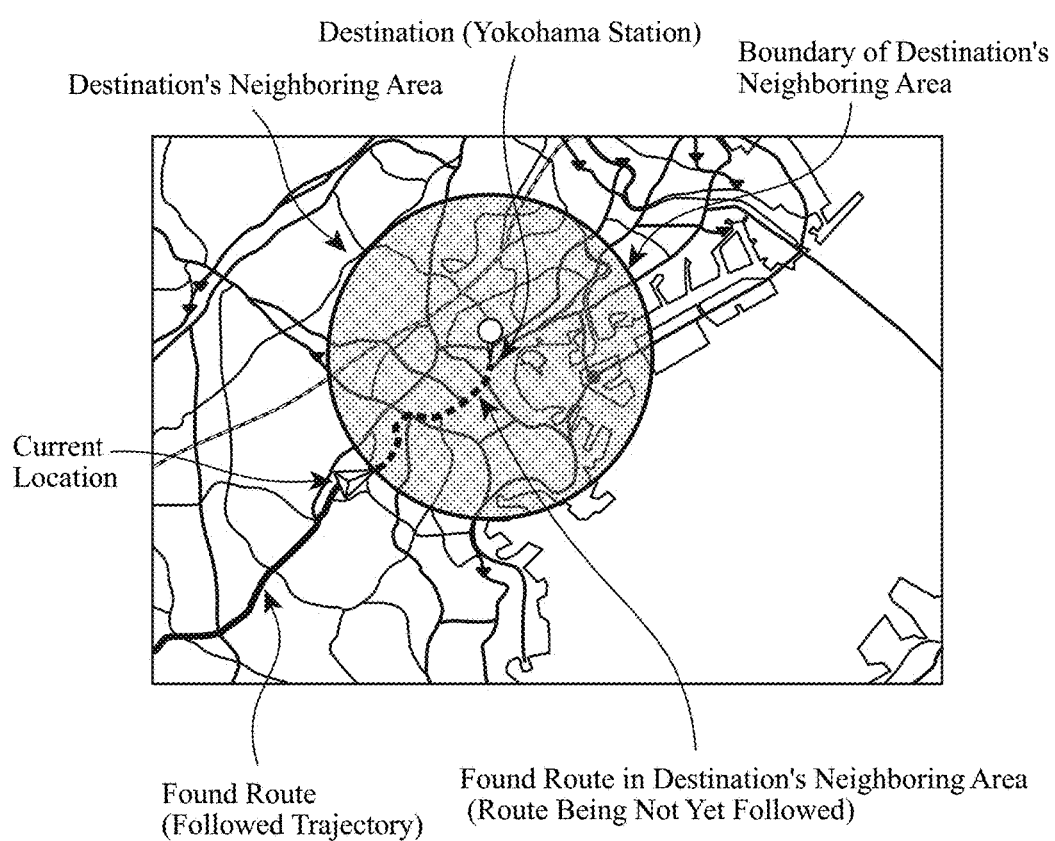
FIG. 12 is a diagram for describing an example of a state in which a current location has approached a circumference of a destination's neighboring area.

The inquiry timing decider 7 decides whether the location of the user's vehicle becomes a certain location close to the boundary of the first destination's neighboring area that was set last time (set at step ST220) (step ST310). In this regard, the "certain location close to the boundary of the destination's neighboring area" may be a spot where the user's vehicle location has entered the destination's neighboring area. As such, "near the boundary of the destination's neighboring area" may be any location that is determined in advance based on the current location and the location of the destination's neighboring area. It is assumed that, as shown in FIG. 12, the spot where the current location has approached a circumference of the first destination's neighboring area is where the user's vehicle location has reached near the boundary of the destination's neighboring area.

If the user's vehicle location has come near the boundary of the first destination's neighboring area at step ST310 (if "YES" at step ST310), processing proceeds to step ST330. On the other hand, if the user's vehicle location has not reached near the boundary of the first destination's neighboring area at step ST310 ("NO" at step ST310), the inquiry timing decider 7 decides whether an input button has been pressed, i.e., whether there has been an input from the input unit 9 (step ST320). The input unit 9 is, for example, a hardware button placed on a steering wheel or a center console, or a button displayed on a liquid crystal touch panel. The user can press such a button when the user wants to actively narrow the destination's neighboring area, thereby forcing an inquiry timing signal to be transmitted to the inquiry timing decider 7.

That is, when the user approaches near the boundary of the destination's neighboring area, the user is automatically asked, and when the user presses the button before approaching near the boundary of the destination's neighboring area, the user can be asked at that timing. For example, if the button or the like is pressed when the user waits at a stop-light, the destination's neighboring area can be narrowed. In addition, by pressing the button whenever the user wants, the destination's neighboring area can be narrowed immediately.

If the input button has not been pressed at step ST320 (if "NO" at step ST320), processing returns to step ST310. On the other hand, if the input button has been pressed at step ST320 (if "YES" at step ST320), processing proceeds to step ST330.

The inquiry timing decider 7 allows an output device (not shown) to output the inquiry sentence generated by the inquiry sentence generator 8 at step ST300 (step ST330). Specifically, for example, an inquiry sentence such as "Where in Yokohama do you go?" or "Where in Yokohama?" is output by voice, or an inquiry sentence is displayed on a screen, or both a voice output and screen display are performed. In response to this, the user answers the inquiry question by inputting a linguistic expression that further narrows the destination area. Here, it is assumed that, for example, "Chinatown" is input.

Figure 13A:
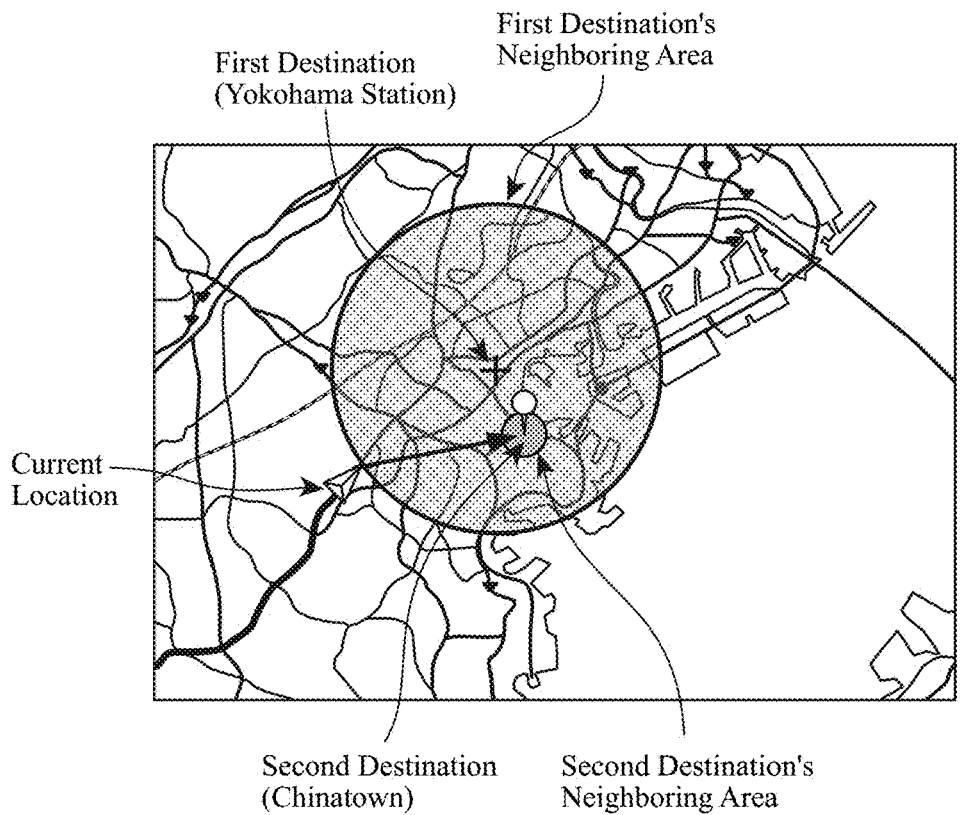
FIGS. 13A and 13B are diagrams illustrating an example of the operation of narrowing a destination's neighboring area.

The destination setting unit 1 receives data about the additional linguistic expression ("Chinatown") (step ST340). Furthermore, the destination setting unit 1 sets a destination (hereinafter, referred to as a second destination) within the last destination's neighboring area, i.e., within the range of the first destination's neighboring area, based on the additional linguistic expression received at step ST340 (step ST350). For example, as shown in FIG. 13A, "Chinatown" is searched for within the range of the first destination's neighboring area, by which the second destination is set. Note that a specific setting method for the second destination is the same as that for the first destination. By doing so, several candidates for a destination are excluded. For example, when inputs are performed in order of "Shibuya"→"Japan A Hotel", it is only necessary to search for a Japan A Hotel in the Shibuya area. That is, Japan A Hotels in Yokohama, Shinagawa, Shinjuku, Ikebukuro and other location are excluded from search results.

Figure 13B:
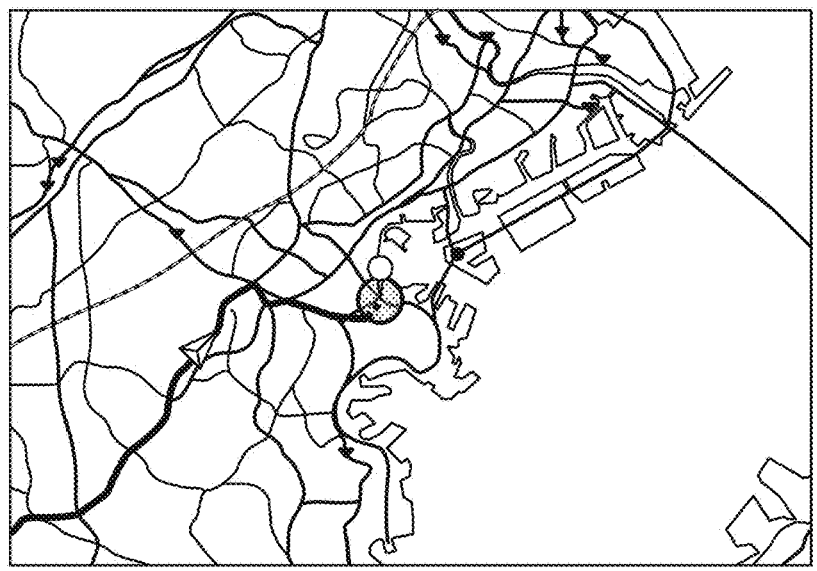

Thereafter, route guidance is provided using the second destination as a destination (FIG. 13B).

The destination's neighboring area setting unit 5 sets a range of a destination's neighboring area (hereinafter, referred to as a second destination's neighboring area), based on the distance between the current location and the second destination (step ST360). A specific determination method for the second destination's neighboring area is the same as the determination method for the first destination's neighboring area.

The route search unit 3 searches for a route from the current location to the second destination (step ST370). Thereafter, the route guidance unit 4 provides route guidance to the second destination (step ST380), and processing ends. Specific operations at steps ST370 and ST380 are the same as those at steps ST120 and ST130.

When the inquiry timing decider 7 decides at step ST310 that the user's vehicle location has come near the boundary of the destination's neighboring area or when the inquiry timing decider 7 decides at step ST320 that there has been an input from the input unit 9, the first destination's neighboring area may be displayed on the display device. In addition, the first and second destination's neighboring areas may be or may not be displayed on a screen at all times. The first and second destinations may be or may not be displayed on a screen at all times, too.

Figure 14A:
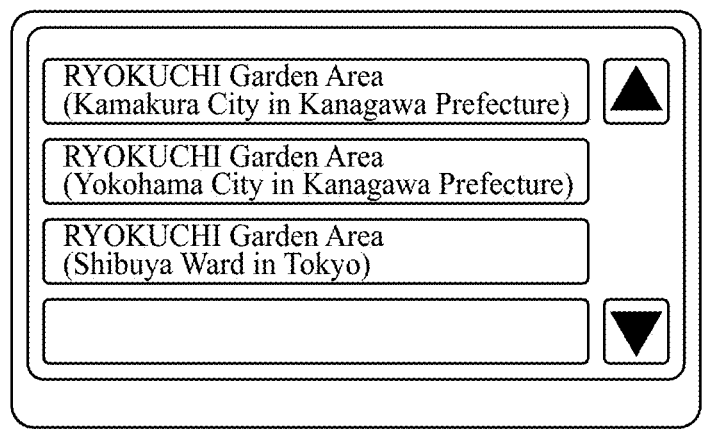
FIGS. 14A and 14B are diagrams illustrating examples for presenting candidates for destination areas to a user.
Figure 14B:
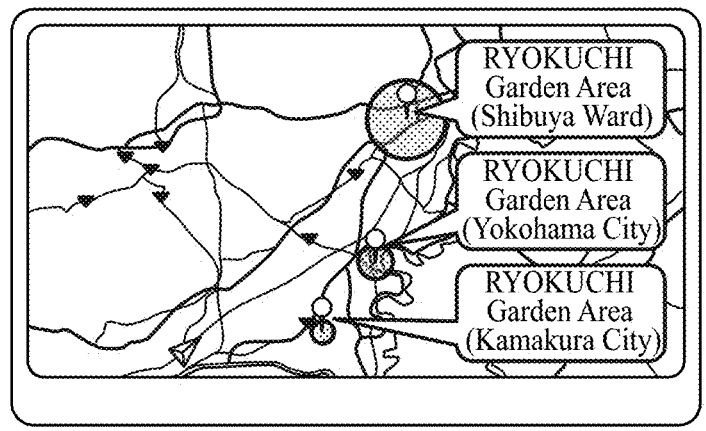

Note that in the second embodiment, too, as in the first embodiment, when, upon the setting of the first destination in the destination setting unit 1 at step ST110, a plurality of destinations with the same name can be set, it is also possible to present candidates to the user so as to prevent a user's unintended destination from being automatically set. Specifically, for example, when the area of the first destination "Ryokuchi Koen" that exists in Kamakura City, Kanagawa Prefecture, in Yokohama City, Kanagawa Prefecture, and in Shibuya Ward, Tokyo can be set, as shown in FIG. 14A, a plurality of candidates for "Ryokuchi Koen Area" that can be a destination can be displayed in a list on a touch panel screen of a display device (not shown). In addition, as shown in FIG. 14B, a map may be displayed on the touch panel screen of the display device (not shown). By doing so, the user can check the candidates for a destination area on the screen and set a destination area, and accordingly, a user's unintended destination area can be prevented from being automatically set.

In addition to the presentation methods shown in FIGS. 14A and 14B, for example, candidates for a destination area may be displayed on a screen and the user may determine a destination area using a hardware selection button installed on a steering wheel or the like. Alternatively, for example, the sentence for checking "Is "Ryokuchi Koen" area in Kamakura? an area in Yokohama? or other area in Shibuya?" or "Is "Ryokuchi Koen" area in Kamakura?" can be output by voice guidance, and the user may answer a message such as "area in Kamakura." or "area in Yokohama." by voice. As such, a method for presenting a plurality of candidates for a destination to the user can be selected as appropriate.

As described above, according to the second embodiment, since a destination's neighboring area that the user wants to go to is determined, when the destination's neighboring area is displayed, the user can easily see, for example, which area the user is heading to, what extent of area the user is heading to as a target, or whether a location that the user wants to go to is included in the destination's neighboring area. In addition, by changing a range of the destination's neighboring area depending on how a destination is set based on an input linguistic expression, when the destination's neighboring area is displayed on a screen, the displayed area can be further approximated to the one imaged by the user.

Furthermore, when the user's vehicle location has approached near the boundary of the destination's neighboring area, an area or a location that the user wants to go to is narrowed within the range of the destination's neighboring area which is set initially, and thus, search results are narrowed, enabling to produce a search route to a more specific destination's direction. In addition, it is also possible to produce a search route to a more specific destination's direction at any timing the user wants, and thus, the user can perform an operation of narrowing the destination's neighboring area toward a specific destination's direction when the vehicle stops at a red light or at timing at which the user stops the vehicle for taking a break, for example.

Third Embodiment

In the second embodiment, the embodiment has been described in which the destination's neighboring area is narrowed. Alternatively, even if a destination's neighboring area is narrowed a plurality of times, since a destination's neighboring area having a two-dimensional area can be always set, a pinpoint destination where a user wants to go finally (hereinafter referred to as a final destination) may need to be set.

In the third embodiment, an embodiment will be described in which a route to a final destination is searched for and guided.

Figure 15:
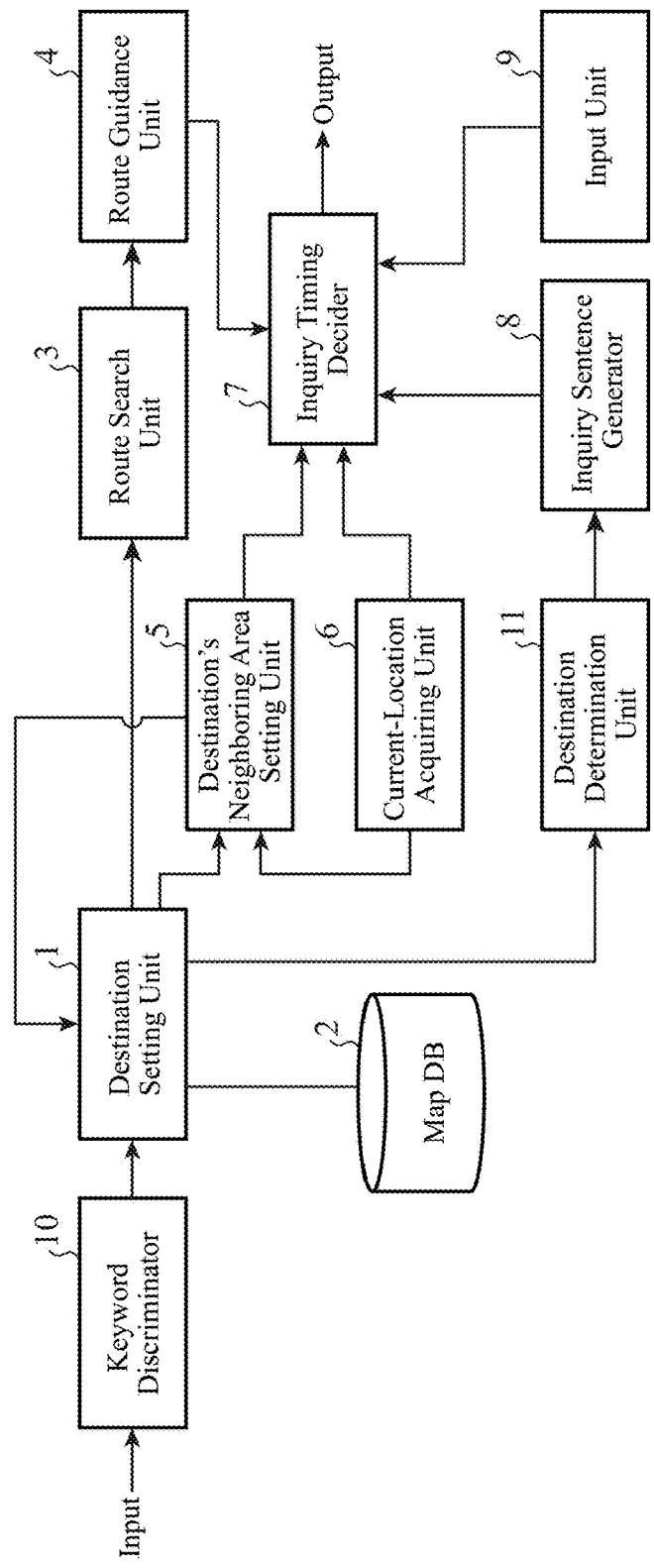
FIG. 15 is a configuration diagram of a route-guidance control device according to a third embodiment of the invention.

FIG. 15 is a configuration diagram of a route-guidance control device according to the third embodiment of the invention.

Note that overlapping descriptions of the same configurations as those described in FIGS. 1 and 5 in the first and second embodiments will be omitted.

The difference between the third embodiment and the second embodiment is, as shown in FIG. 15, that the device further includes a keyword discriminator 10 and a destination determination unit 11.

The keyword discriminator 10 receives data about a linguistic expression input by a user and decides whether a linguistic expression input last time is the same as the linguistic expression input this time. Note that for the first input, the keyword discriminator 10 transmits received data about a linguistic expression as it is to a destination setting unit 1, and for the second and subsequent reception, the keyword discriminator 10 decides whether the linguistic expression is the same as the last linguistic expression and transmits the result of the decision to the destination setting unit 1.

The destination determination unit 11 decides which one of a plurality of search criteria is used to determine a destination which is set by the destination setting unit 1, and transmits the result of the decision to an inquiry sentence generator 8. In this regard, the destination setting unit 1 has stored data as to which search criterion is used to set a destination when setting the destination, and transmits the search criterion to the destination determination unit 11.

Figure 16:
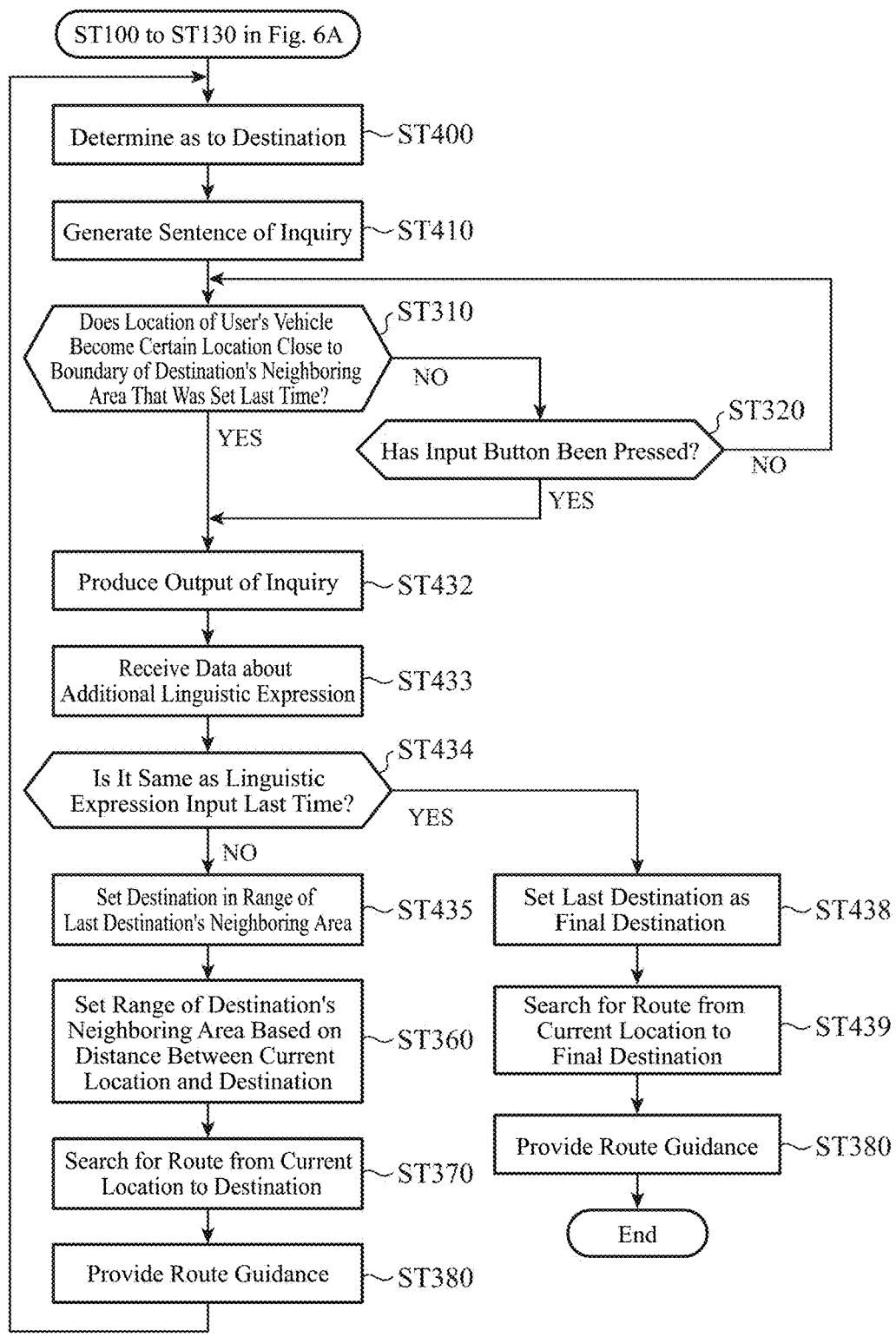
FIG. 16 is a flowchart for describing the operation of the route-guidance control device according to the third embodiment of the invention.

FIG. 16 is a flowchart for describing the operation of the route-guidance control device according to the third embodiment of the invention. With reference to FIG. 16, the operation will be described. Note that it is assumed that a plurality of search criteria for determining a destination are those shown in FIG. 3.

It is assumed that the operation of FIG. 16 is performed after the operations at steps ST100, ST110, and ST220 to ST130 of FIG. 6A in the second embodiment. It is assumed that in the process at step ST100 the keyword discriminator 10 receives a linguistic expression input for the first time and transmits the linguistic expression as it is to the destination setting unit 1.

The destination determination unit 11 decides which search criterion is used to determine a destination which is set by the destination setting unit 1, and transmits the result of the decision to the inquiry sentence generator 8 (step ST400).

When the inquiry sentence generator 8 receives the result of the decision made by the destination determination unit 11 at step ST400, the inquiry sentence generator 8 generates a sentence of inquiry in accordance with the content of the received result of the decision (step ST410).

Specifically, for example, when an input linguistic expression is "Shin-Yokohama" and the destination setting unit 1 sets a destination to "Shin-Yokohama Station" using a first-priority search criterion of FIG. 3, an inquiry sentence questioning "Where in Shin-Yokohama do you go?" is generated. Alternatively, when an input linguistic expression is "Hakone" and the destination setting unit 1 sets a destination to "Hakone Town Hall" using a second-priority search criterion of FIG. 3, an inquiry sentence questioning "Where in Hakone do you go?" is generated. Note that data about an input linguistic expression is received by the destination determination unit 11 from the destination setting unit 1 and transmitted together with the result of the decision to the inquiry sentence generator 8.

On the other hand, for example, when an input linguistic expression is "Yokohama Tower" and the destination setting unit 1 sets a destination to "Yokohama Tower" using a third-priority search criterion of FIG. 3, the inquiry sentence generator 8 generates an inquiry sentence questioning "Where in the Yokohama Tower Area do you go? Or do you go to Yokohama Tower?".

As such, the inquiry sentence generator 8 generates an inquiry sentence based on the result of the decision made by the destination determination unit 11.

Note that the above-described inquiry sentences are examples and other expressions may be used.

When the inquiry sentence generator 8 generates an inquiry sentence at step ST410, an inquiry timing decider 7 decides whether a user's vehicle location has become near a boundary of a destination's neighboring area (first destination's neighboring area) which was set last time (step ST310). In addition, the inquiry timing decider 7 decides whether an input button has been pressed (step ST320). Specific operations at these steps ST310 and ST320 are the same as those at steps ST310 and ST320 of FIG. 6B and thus the detailed descriptions will be omitted.

If it is decided at step ST310 that the user's vehicle location has become near the boundary of the destination area (first destination's neighboring area) which was set last time (if "YES" at step ST310), or if it is decided at step ST320 that the input button has been pressed (if "YES" at step ST320), the inquiry timing decider 7 allows an output device (not shown) to output the inquiry sentence generated by the inquiry sentence generator 8 at step ST410 (step ST432). Note that the inquiry sentence may be output by voice or may be output on a screen. Alternatively, both voice and screen outputs may be performed. In response to this, the user answers the inquiry question by further inputting a linguistic expression. In this regard, it is assumed that, for example, "Japan A Hotel" or "Yokohama Station" is input.

The keyword discriminator 10 receives data about the additional linguistic expression (step ST433).

When the keyword discriminator 10 receives the data about the additional linguistic expression at step ST433, the keyword discriminator 10 decides whether the linguistic expression input this time is the same as the linguistic expression input last time (the linguistic expression received at step ST100 of FIG. 6A) (step ST434). Specifically, the keyword discriminator 10 has stored the received data about the linguistic expression, and decides whether the linguistic expression input this time is the same as the linguistic expression input last time, based on the data about the linguistic expression received last time and the data about the additional linguistic expression.

If the linguistic expression input additionally is different from the linguistic expression input last time at step ST434 (if "NO" at step ST434), processing proceeds to step ST435. On the other hand, if the linguistic expression input additionally is the same as the linguistic expression input last time at step ST434 (if "YES" at step ST434), processing proceeds to step ST438. For example, when the linguistic expression input last time is "Yokohama Station", if the linguistic expression input this time is "Japan A Hotel", processing proceeds to step ST435. If the linguistic expression input this time is "Yokohama Station", processing proceeds to step ST438.

At step ST438, the destination setting unit 1 sets the currently set destination, i.e., the last destination (first destination), to be a final destination. Specifically, if the linguistic expression input last time is the same as the linguistic expression input this time, then it can be said that it is highly likely that the user wants it to be a destination, and thus, it is decided that any further inquiry question or any further narrowing of the destination is not necessary. For example, when the linguistic expression input last time is "Yokohama Station" and the linguistic expression input this time is also "Yokohama Station", "Yokohama Station" is set as a final destination. Thereafter, an output of an inquiry question is not performed and route guidance to the final destination is provided. Note that the final destination refers to a pinpoint location that the user wants to arrive finally.

A route search unit 3 searches for a route from a current location to the final destination (step ST439), and a route guidance unit 4 provides route guidance to the final destination (step ST380). Specific operations at these steps ST439 and ST380 are the same as those at steps ST370 and ST380 of FIG. 6B. Note that although here a route search is performed at step ST439, without performing another route search, a search route to the last destination (e.g., "Yokohama Station"), i.e., the route searched for at step ST120 of FIG. 6A, may be used as it is.

On the other hand, at step ST435, the destination setting unit 1 obtains the last destination's neighboring area (first destination's neighboring area) from a destination's neighboring area setting unit 5, and sets a destination (second destination) within a range of the obtained first destination's neighboring area. Note that specific operation at this step ST435 is the same as that at step ST350 of FIG. 6B. For example, when the linguistic expression input last time is "Yokohama Station" and the linguistic expression input this time is "Japan A Hotel", the destination setting unit 1 sets a destination for Japan A Hotel within a first destination's neighboring area for "Yokohama Station". Thereafter, route guidance is provided with the second destination being a destination.

The destination's neighboring area setting unit 5 sets a range of a destination's neighboring area (hereinafter referred to as a second destination's neighboring area), based on the distance between the current location and the second destination (step ST360), the route search unit 3 searches for a route from the current location to the second destination (step ST370), and the route guidance unit 4 provides route guidance to the second destination (step ST380). Specific operations at steps ST360 to ST380 are the same as those at steps ST360 to ST380 of FIG. 6B as described in the second embodiment.

Thereafter, processing returns to step ST400 and subsequent processes are repeated. That is, an inquiry question is output again and processes are repeated until a destination where the user wants to go is obtained (until a final destination is set).

As described above, according to the third embodiment, even by a vague instruction which is close to a human sense as if the user asks a taxi driver his/her destination, the vehicle can start to run by drawing a search route to a destination's direction, and a spot that the user wants to go to finally can be set as a pinpoint destination, and thus, the user can arrive at the final destination.

Fourth Embodiment

In the first to third embodiments, it is assumed that the linguistic expression input by a user can be one keyword (e.g., "Yokohama"). In the Fourth embodiment, an embodiment will be described in which even when a linguistic expression including two or more keywords (e.g., "Yokohama Chinatown") is received, a destination and a destination's neighboring area can be set.

Figure 17:
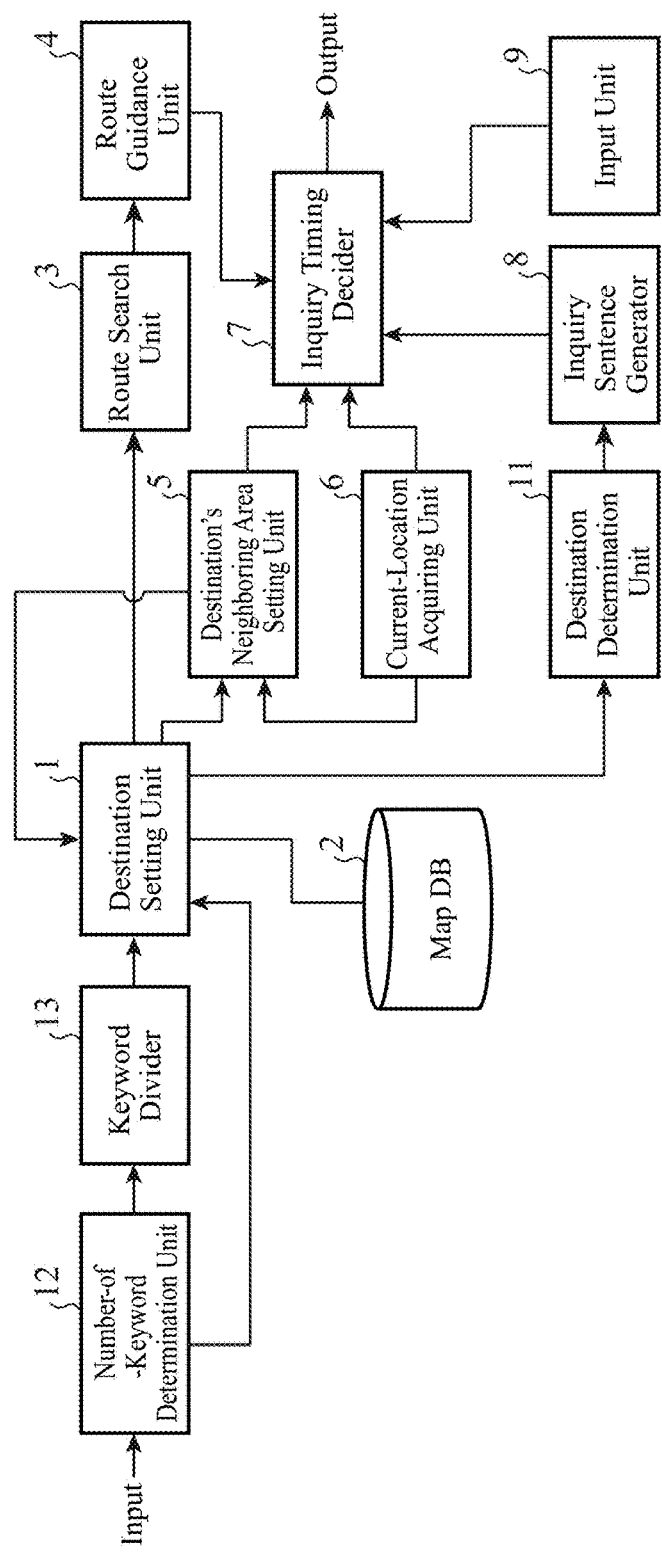
FIG. 17 is a configuration diagram of a route-guidance control device according to a fourth embodiment of the invention.

FIG. 17 is a configuration diagram of a route-guidance control device according to the fourth embodiment of the invention.

Note that overlapping descriptions of the same configurations as those described in FIG. 5 in the second embodiment will be omitted.

The difference between the fourth embodiment and the second embodiment is, as shown in FIG. 17, that the device further includes a number-of-keyword determination unit 12 and a keyword divider 13.

The number-of-keyword determination unit 12 determines whether a received linguistic expression includes one keyword (a word) or two or more keywords (words).

The keyword divider 13 divides the received linguistic expression into two or more keywords.

FIG. 18 is a flowchart for describing the operation of the route-guidance control device according to the fourth embodiment of the invention. With reference to FIG. 18, the operation will be described. In this regard, it is assumed that, for example, a linguistic expression including two keywords "Yokohama Chinatown" is received and a plurality of search criteria for setting a destination are those shown in FIG. 3.

A destination setting unit 1 receives data about where a user wants to go, which is input from an input device (step ST100). Step ST100 is the same as step ST100 of FIG. 6A as described in the second embodiment.

The number-of-keyword determination unit 12 determines whether the number of keywords included in the linguistic expression received at step ST100 is equal to one (step ST710). Counting of the number of keywords may be performed using existing techniques.

If it is determined at step ST710 that the number of keywords included in the received linguistic expression is equal to one (if "YES" at step ST710), the number-of-keyword determination unit 12 transmits the received linguistic expression to the destination setting unit 1, and the destination setting unit 1 performs processes at and after step ST110 of FIG. 6A. Specific operations are the same as those described in the second embodiment and thus the detailed descriptions will be omitted.

If it is determined at step ST710 that the number of keywords included in the received linguistic expression is not equal to one (if "NO" at step ST710), the keyword divider 13 divides the received linguistic expression into keywords (step ST720). Here, since it is assumed that the linguistic expression "Yokohama Chinatown" is received, the keyword divider 13 divides the linguistic expression into two keywords, the first keyword "Yokohama" and the second keyword "Chinatown". The keyword division may also be performed using existing techniques.

The destination setting unit 1 sets a candidate for a destination (referred to as first candidate for a destination) using the first keyword obtained by the division at step ST720 (step ST730). Specifically, the destination setting unit 1 sets "Yokohama Station" to the first candidate for a destination, based on the word "Yokohama" which is the first keyword.

A destination's neighboring area setting unit 5 sets a range of a candidate for a destination's neighboring area (referred to as first candidate for a destination's neighboring area), based on a distance between the current location and the first candidate for a destination (step ST740).

The destination setting unit 1 sets a candidate for a destination (second candidate for a destination) in the range of the first candidate for a destination's neighboring area which is set by the destination's neighboring area setting unit 5 at step ST740, based on the second keyword (step ST750). Specifically, the second keyword "Chinatown" is set as the second candidate for a destination. In this regard, if the candidate for a destination set at this step ST750 is the one set based on the last keyword, then the destination setting unit 1 sets this as a destination. That is, here, since "Chinatown" is the candidate for a destination that is set using the last keyword, "Chinatown" becomes a destination.

When there are a plurality of second candidates for a destination which are set using the second keyword within the first candidate for a destination's neighboring area, for example, the spot that is closest in distance from the first candidate for a destination may be set as the second candidate for a destination.

The destination's neighboring area setting unit 5 sets a destination's neighboring area candidate (referred to as second candidate for a destination's neighboring area) in accordance with a distance between the first candidate for a destination determined by the destination setting unit 1 at step ST730 and the second candidate for a destination which are set by the destination setting unit 1 at step ST750 (step ST760). For a specific determination method for the second candidate for a destination's neighboring area, as with those described using FIGS. 7 and 8 in the second embodiment, the destination's neighboring area setting unit 5 has stored predetermined conditions for a range of a destination's neighboring area in accordance with the distance between the first candidate for a destination and the second candidate for a destination, and sets the second candidate for a destination's neighboring area in accordance with the conditions. The distance between the first candidate for a destination and the second candidate for a destination and the range of a candidate for a destination's neighboring area based on the distance can be set as appropriate. Note also that as with the destination, the destination's neighboring area setting unit 5 sets a candidate for a destination's neighboring area set using the last keyword, as a destination's neighboring area. Therefore, the second candidate for a destination's neighboring area is set as a destination's neighboring area.

A route search unit 3 searches for a route from a current location to the destination (step ST770), and a route guidance unit 4 guides the route searched for at step ST770 (step ST780).

Here, the processes at steps ST730 to ST780 will be described referring to FIGS. 19A and 19B.

Figure 19A:
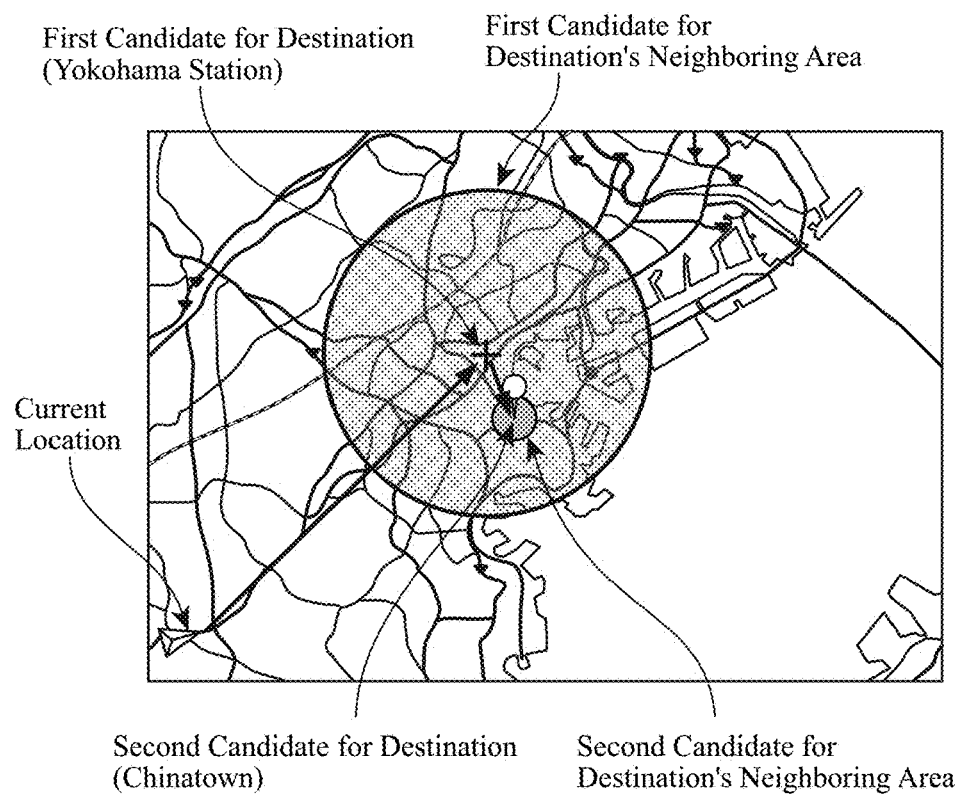
FIGS. 19A and 19B are diagrams illustrating examples for setting a destination using two keywords.

As shown in FIG. 19A, at step ST730, "Yokohama Station" is set as a first candidate for a destination by the first keyword "Yokohama", and at step ST740 a first candidate for destination's neighboring area for "Yokohama Station" (first candidate for a destination) is set. Then, at step ST750, a second candidate for a destination for the second keyword "Chinatown" is set within a range of the first candidate for a destination's neighboring area. Furthermore, at step ST760, a second candidate for destination's neighboring area in accordance with the distance between "Yokohama Station" (first candidate for a destination) and "Chinatown" (second candidate for a destination) is set. In this regard, since the Chinatown (second candidate for a destination) is a candidate for the destination that is set using the last keyword among the keywords included in the received linguistic expression, the destination setting unit 1 sets the Chinatown (second candidate for a destination) as a destination, and sets the second candidate for a destination's neighboring area as a destination's neighboring area.

Figure 19B:
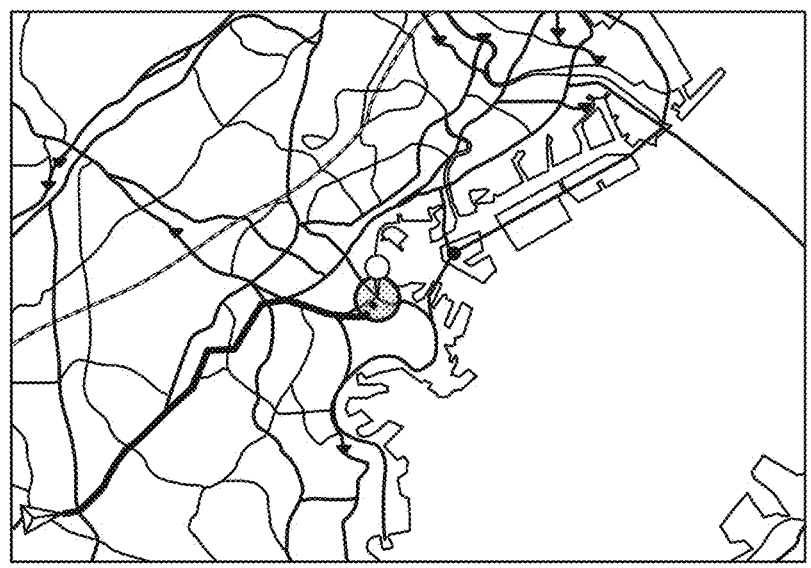

When a route from a current location to the destination is searched for at step ST770, at step ST780, as shown in FIG. 19B, route guidance starts.

Note that although here, as shown in FIG. 19B, the destination and the destination's neighboring area are displayed on a screen upon route guidance, the configuration is not limited thereto, and the destination and the destination's neighboring area may not be displayed on a screen, or candidates for destination's neighboring area may also be displayed on a screen.

As such, in the fourth embodiment, the number-of-keyword determination unit 12 decides the number of keywords (words) included in a received linguistic expression. When the received linguistic expression includes a plurality of keywords (words), the keyword divider 13 divides the received linguistic expression into keywords. A candidate for a destination and a candidate for a destination's neighboring area for each of the keywords obtained by the division are set in order from the first keyword. The settings of a candidate for a destination and a candidate for a destination's neighboring area for a next keyword within the candidate for a destination's neighboring area that are set immediately before the next keyword are repeated. When a candidate for a destination and a candidate for a destination's neighboring area for the last keyword are set, the candidate for a destination for the last keyword is set as a destination.

By this, a narrower area can be set as a destination's neighboring area, compared to the case of inputting only "Yokohama" from a current location or inputting only "Chinatown". In addition, if only "Chinatown" is input, then there is a possibility that a plurality of "Chinatowns" may appear as candidates from all around the country. Hence, Yokohama Chinatown which is the location that the user wants to go to needs to be searched for, selected, and determined from the plurality of search results. On the other hand, when "Yokohama Chinatown" is input, only Yokohama Chinatown can be securely set as a destination.

Note that although here the case of two keywords such as "Yokohama Chinatown" is described as an example, in the case of three or more keywords, a candidate for a destination and a destination's neighboring area may be set in turn for each keyword, and a candidate for a destination that is set from the last keyword may be set as a destination. For example, in the case of "Yokohama Chinatown Japan A Hotel", a candidate for a destination for "Chinatown" that exists in a candidate for a destination's neighboring area for "Yokohama" may be set, and a destination for "Japan A Hotel" that exists in a candidate for a destination's neighboring area for "Chinatown" may be further set.

In addition, although here, of "Yokohama Chinatown", "Yokohama" that appears first is considered the first keyword and "Chinatown" that appears next is considered the second keyword, the configuration is not limited thereto, and the order of keywords may be set according to the language. For example, in the case of Japanese, the order of keywords is "Yokohama Chinatown" and it is assumed that an area that appears first ("Yokohama") is wider than an area that appears next ("Chinatown"). On the other hand, in the case of English, like "Times Square in New York", an area that appears later ("New York") is larger than an area that appears first ("Times Square"). In such a case, a setting may be performed such that "New York" is the first keyword.

As described above, according to the fourth embodiment, even when a linguistic expression including a plurality of keywords is input, a destination and a destination's neighboring area can be set. In addition, a destination and a destination's neighboring area can be further narrowed compared to the case of inputting a linguistic expression by one keyword, and thus, when the destination's neighboring area is displayed on a screen, the displayed area can be further approximated to the one expected by the user.

Fifth Embodiment

In the first embodiment, when there is a station, facility or other entity which has the same name as a linguistic expression input by a user, location information indicating the station, facility or other entity which has the same name as the input linguistic expression is obtained from the map DB 2 to thereby set a destination. However, when location information cannot be obtained from the map DB 2 because a linguistic expression is input for which there is no station, facility or other entity which has the same name as the input linguistic expression, a destination cannot be set. In the fifth embodiment, an embodiment will be described in which even if a linguistic expression is input for which location information cannot be obtained from the map DB 2, a destination can be set.

Figure 20:
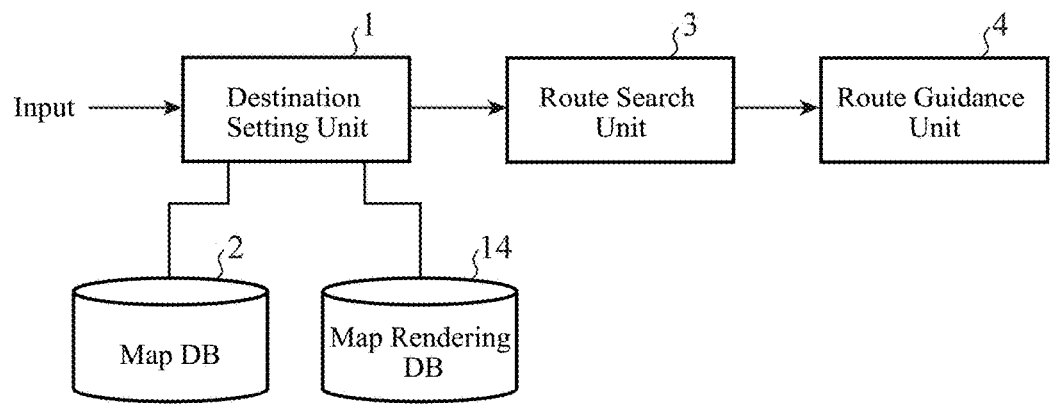
FIG. 20 is a configuration diagram of a route-guidance control device according to a fifth embodiment of the invention.

FIG. 20 is a configuration diagram of a route-guidance control device according to the fifth embodiment of the invention.

The difference between the fifth embodiment and the first embodiment is, as shown in FIG. 20, that a destination setting unit 1 refers to a map rendering database (hereinafter referred to as a map rendering DB) 14.

The map rendering DB 14 has stored, for example, the region names (characters used for map rendering), display ranges, display content, and maximum and minimum scales of geographic information.

Figure 21:
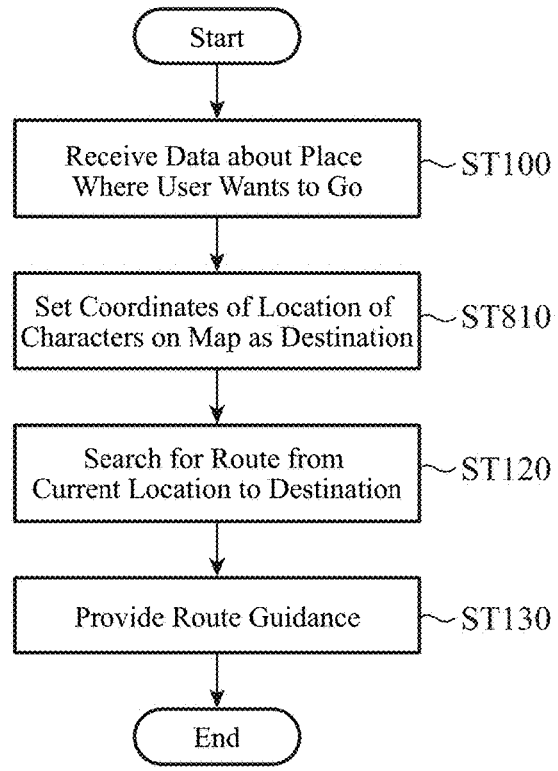
FIG. 21 is a flowchart showing the operation of the route-guidance control device according to the fifth embodiment of the invention.

FIG. 21 is a flowchart showing the operation of the route-guidance device according to the fifth embodiment of the invention. Note that steps ST100, ST120, and ST130 of FIG. 21 are the same as steps ST100, ST120, and ST130 of FIG. 2 described in the first embodiment, and thus, a detailed description is omitted. Here, the following description is made assuming that the linguistic expression "Miura Peninsula" that is not included in names of municipalities or station names is input and a destination search is performed using the plurality of search criteria shown in FIG. 3.

When data about a linguistic expression ("Miura Peninsula") indicating where a user wants to go is received at step ST100, the destination setting unit 1 searches for a destination based on the plurality of search criteria of FIG. 3. At this time, there is no "station" or "name of prefecture or municipality" having the same name as "Miura Peninsula", but the characters displayed on a map include the same characters ("Miura Peninsula") as the input linguistic expression. Hence, the destination setting unit 1 accesses to the map rendering DB 14 and sets the coordinates of a location of the characters displayed on the map, as a destination (step ST810). Specifically, the destination setting unit 1 transforms the center of a display range of the characters ("Miura Peninsula") which are displayed on the map and stored as characters to be used for map rendering, into location coordinates on the map, and further sets the transformed location coordinates as a destination. Note that a method for transforming into location coordinates on the map may be based on latitude and longitude, but the method is not limited thereto, and any method may be employed as long as the location coordinates of the center of a display range of characters displayed on the map can be obtained.

The process at step ST810 will be described referring to FIGS. 22A and 22B.

Figure 22A:
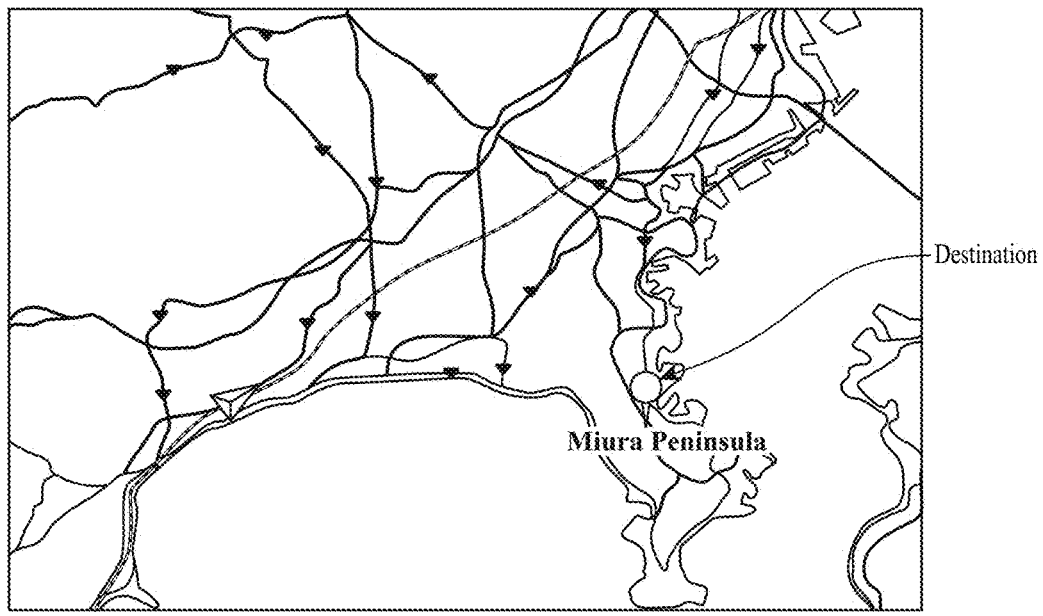
FIGS. 22A and 22B are diagrams illustrating examples for setting the coordinates of a location of characters on a map as a destination.

The destination setting unit 1 transforms the center of a display range on a map where "Miura Peninsula" is displayed, such as that shown in FIG. 22A, into location coordinates and sets the location coordinates as a destination.

In addition, it is assumed that, for example, data about the word "Iwase" located in Iwase, Kamakura City is received at step ST100. In this case, "Iwase" is, as with "Miura Peninsula", not included in names of municipalities or station names nor in government offices or intersection names, but is written on the map (see FIG. 22B), and the name of the geographic information "Iwase" together with its display range is stored in the map rendering DB 14.

Figure 22B:
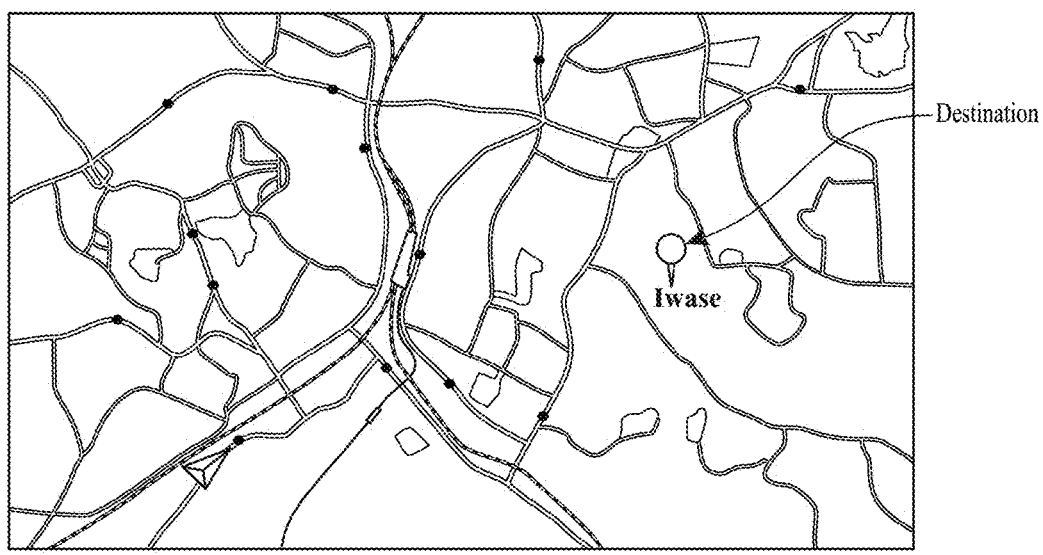

The destination setting unit 1 transforms the center of the display range on the map where "Iwase" is displayed, such as that shown in FIG. 22B, into location coordinates and sets the location coordinates as a destination.

The description returns to the flow of FIG. 21.

A route search unit 3 searches for a route from a current location to the destination set by the destination setting unit 1 at step ST810 (step ST120), and a route guidance unit 4 provides route guidance (step ST130). Specific operations at steps ST120 and ST130 are the same as those at steps ST120 and ST130 of FIG. 2 as described in the first embodiment.

As described above, according to the fifth embodiment, even if a linguistic expression is input for which location information indicating a station, facility or other entity which has the same name as the input linguistic expression cannot be obtained from the map DB, a destination can be set.

Sixth Embodiment

In the fifth embodiment, the embodiment has been described in which, in the case where a linguistic expression is input for which location information indicating a station, facility or other entity which has the same name as the input linguistic expression cannot be obtained from the map DB 2, if there are characters such as a name displayed on a map, then a destination can be set based on the location represented by the characters. In the sixth embodiment, an embodiment will be described in which a destination is set even when a name is input for which location information indicating a station, facility or other entity which has the same name as the input linguistic expression cannot be obtained from the map DB 2, or when names (e.g., an area called its commonly known name) which are not displayed on a map are input.

A configuration of a route-guidance control device according to the sixth embodiment is the same as that described in FIG. 1 in the first embodiment and thus is omitted.

Figure 23:
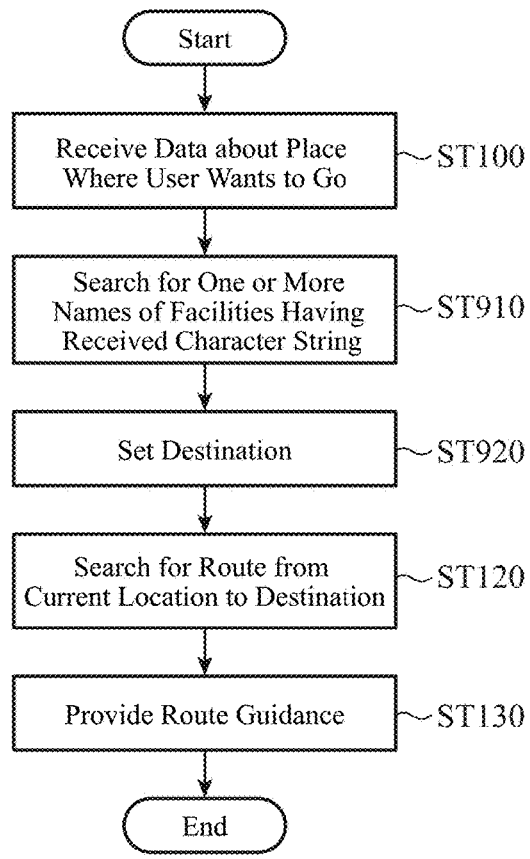
FIG. 23 is a flowchart for describing the operation of a route-guidance control device according to a sixth embodiment of the invention.

FIG. 23 is a flowchart for describing the operation of the route-guidance control device according to the sixth embodiment of the invention. Note that steps ST100, ST120, and ST130 of FIG. 23 are the same as steps ST100, ST120, and ST130 of FIGS. 2 and 21 described in the first and fifth embodiments and thus a detailed description is omitted. Here, the following description is made assuming that the linguistic expression "Shonan" is input and a destination search is performed using the plurality of search criteria shown in FIG. 3.

When data about a linguistic expression ("Shonan") indicating where a user wants to go is received at step ST100, a destination setting unit 1 searches for a destination based on the plurality of search criteria. At this time, there is no "station" or "name of prefecture or municipality" having the same name as "Shonan", but there are a plurality of names of facilities including the name "Shonan". The destination setting unit 1 accesses a map DB 2 to search for the name of the facility that includes a received character string (step ST910).

Figure 24:
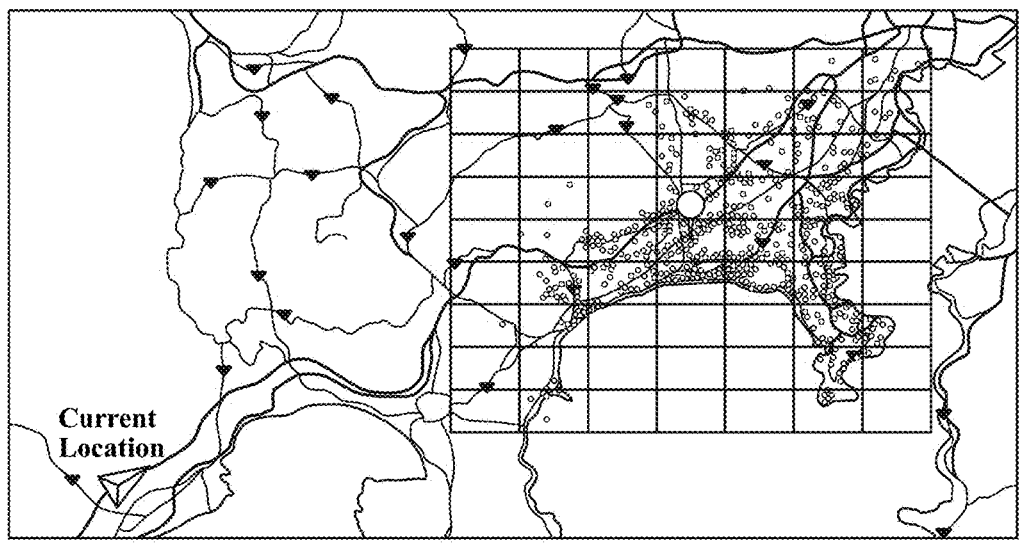
FIG. 24 is a diagram showing an example for setting a destination using a distribution of facilities.

The destination setting unit 1 sets a destination based on a distribution of facilities that are obtained as a result of the search at step ST910 (step ST920). Specifically, the destination setting unit 1 divides a map by meshes, checks a distribution of facilities in each mesh, identifies a mesh having the largest number of corresponding facilities, and sets the coordinates of a location of the center of the mesh as a destination (see FIG. 24). Note that the setting of a destination is not limited thereto, and taking into account the distribution density of facilities, the center of the distribution density may be set as a destination. As such, the destination can be set as appropriate.

A route search unit 3 searches for a route from a current location to the destination set by the destination setting unit 1 at step ST920 (step ST120), and a route guidance unit 4 provides route guidance (step ST130). Specific operations at steps ST120 and ST130 are the same as those at steps ST120 and ST130 of FIG. 2 described in the first embodiment.

As described above, according to the sixth embodiment, a destination can be set even when location information indicating a station, facility or other entity which has the same name as an input linguistic expression cannot be obtained from the map DB and also when the same name as the input linguistic expression is not displayed on a map.

Seventh Embodiment

In the first embodiment, a destination is set in accordance with the orders of priority of a plurality of search criteria. In the seventh embodiment, an embodiment will be described in which when, in addition to a high-preferential candidate for a destination, there are further candidates for a destination that apply to search criteria and that are closer in distance from a current location than the high-preferential candidate for a destination is, a destination is set taking into account a distance from the current location.

A configuration of a route-guidance control device according to the seventh embodiment is the same as that described in FIG. 1 in the first embodiment and thus is omitted.

Figure 25:
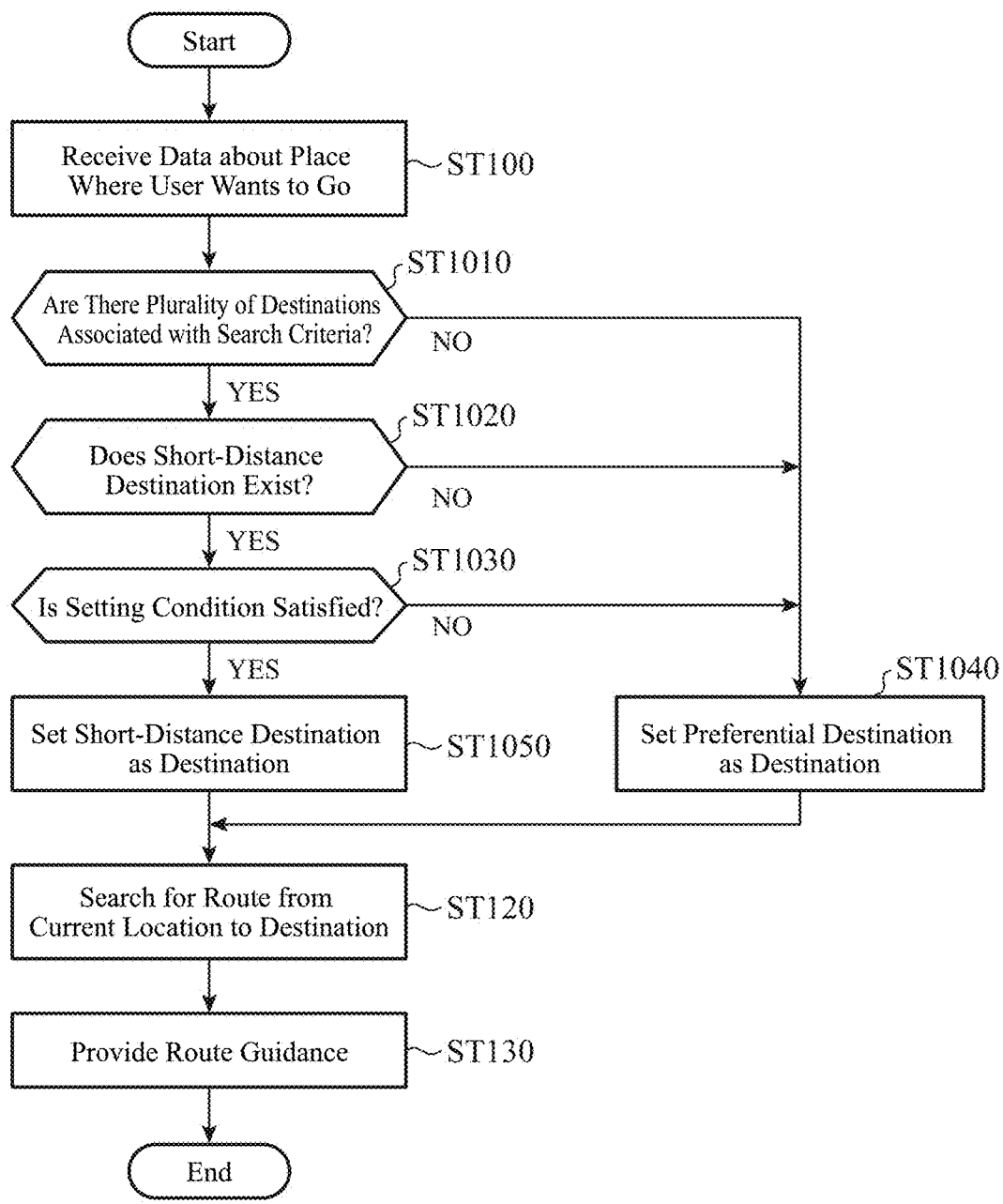
FIG. 25 is a flowchart for describing the operation of a route-guidance control device according to a seventh embodiment of the invention.

FIG. 25 is a flowchart for describing the operation of the route-guidance control device according to the seventh embodiment of the invention. Note that steps ST100, ST120, and ST130 of FIG. 25 are the same as steps ST100, ST120, and ST130 of FIG. 2 described in the first embodiment and thus a detailed description is omitted.

When data about a linguistic expression indicating where a user wants to go is received at step ST100, a destination setting unit 1 searches for destinations that can be searched for using a plurality of search criteria, in accordance with the orders of priority and decides whether there are a plurality of destinations that apply to the search criteria, i.e., whether there are destinations that can be searched for using a plurality of search criteria in addition to a destination that can be searched for using a highest-priority search criterion (referred to as preferential destination) (step ST1010).

If there are no plurality of destinations that apply to search criteria at step ST1010, i.e., if there is only one destination (if "NO" at step ST1010), the destination setting unit 1 sets the preferential destination, i.e., a single destination because only the single destination applies to a search criterion, as a destination (step ST1040).

On the other hand, if there are destinations that apply to a plurality search criteria in addition to the preferential destination at step ST1010 (if "YES" at step ST1010), the destination setting unit 1 accesses to the map DB 2 and calculates a distance between the current location and each of the destinations that apply to the search criteria, and further decides whether there are destinations whose distances from the current location are shorter than a distance between the current location and the preferential destination (referred to as short-distance destinations) (step ST1020).

If there are no short-distance destinations at step ST1020 (if "NO" at step ST1020), the destination setting unit 1 sets the preferential destination to be a destination (step ST1040).

If there are short-distance destinations at step ST1020 (if "YES" at step ST1020), the destination setting unit 1 decides whether the short-distance destinations satisfy a setting condition in advance (step ST1030). Here, for example, the setting condition is that "comparing to the distance between the current location and the preferential destination, the distance from the current location to the short-distance destination is less than or equal to 1/10 of the distance from the current location to the preferential destination".

If there is a short-distance destination that satisfies the setting condition at step ST1030 (if "YES" at step ST1030), the destination setting unit 1 sets the short-distance destination that satisfies the setting condition, as a destination (step ST1050). That is, here, a short-distance destination whose distance from the current location is less than or equal to 1/10 of the distance to the preferential destination is set as a destination. Note that when there are a plurality of corresponding short-distance destinations, a short-distance destination closer to the current location may be set as a destination.

If there is no spot that satisfies the setting condition at step ST1030 (if "NO" at step ST1030), the destination setting unit 1 sets the preferential destination as a destination (step ST1040).

A route search unit 3 searches for a route to the destination set by the destination setting unit 1 (step ST120), and route guidance is provided (step ST130). Specific operations at steps ST120 and ST130 are the same as those at steps ST120 and ST130 of FIG. 2 as described in the first embodiment.

Note that the setting condition may be that "the distance between the current location and the short-distance destination is shorter than the distance from the current location to the preferential destination". As such, the setting condition can be set as appropriate.

As described above, according to the seventh embodiment, for example, even when a plurality of different spots such as a station name and an intersection name are considered destinations, a destination that is more suitable for a user's situation can be set.

Eighth Embodiment

Although the above first to seventh embodiments describe that the route-guidance control devices of the invention may be applied to automotive navigation systems, the application is not limited to navigation devices in automotive navigation systems and may be navigation devices for movable bodies including humans, vehicles, railroads, boats, aircraft or other entities, or may be servers in navigation systems. In addition, the route-guidance control devices of the invention can also be applied to things in any form, such as navigation system applications which are installed on portable information terminals such as smartphones, tablet PCs, and mobile phones.

Figure 26:
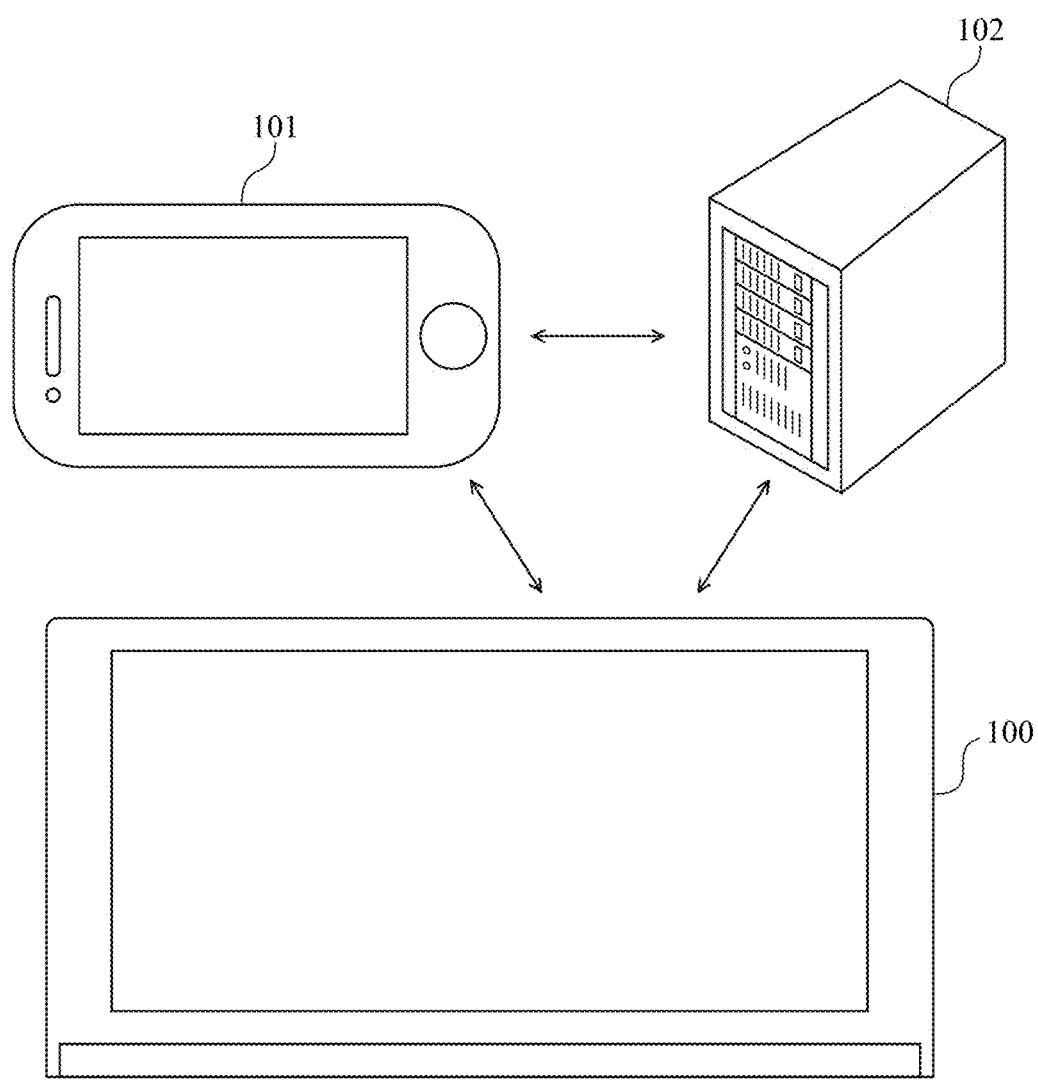
FIG. 26 is a diagram showing an overview of a navigation system of an eighth embodiment of the invention.

FIG. 26 is a diagram showing an overview of a navigation system of an eighth embodiment of the invention. The navigation system can adopt various modes, e.g., an in-vehicle device 100 performs a route-guidance control process in cooperation with at least one of a portable information terminal 101, such as a smartphone, and a server 102, or at least one of the portable information terminal 101, such as a smartphone, and the server 102 performs route-guidance control and map information is displayed on the in-vehicle device 100. A configuration mode of the navigation system will be described below.

Description will be made of a case in which in the navigation system of the eighth embodiment, the server 102 performs a route-guidance control process, and results of the route-guidance control are displayed on the in-vehicle device 100 and thereby provided to a user, and a case in which the portable information terminal 101 performs a route-guidance control process in cooperation with the server 102, and results of the route-guidance control are displayed on the in-vehicle device 100 and thereby provided to the user, in addition to a case in which the in-vehicle device 100 shown in FIG. 26 have all functions of the route-guidance control devices of the first to seventh embodiments.

First, the case in which the server 102 performs route-guidance control and results of the route-guidance control are displayed on the in-vehicle device 100, i.e., a case in which the in-vehicle device 100 functions as a display device in cooperation with the server 102 having a route-guidance control function, will be described.

In this configuration, a case is considered in which the in-vehicle device 100 directly communicates with the server 102 or the in-vehicle device 100 communicates with the server 102 via the portable information terminal 101.

The server 102 functions as a guidance control device including a destination setting unit 1, a map DB 2, a route search unit 3, a destination's neighboring area setting unit 5, a current-location acquiring unit 6, an inquiry timing decider 7, an inquiry sentence generator 8, a keyword discriminator 10, a destination determination unit 11, a number-of-keyword determination unit 12, a keyword divider 13, and a map rendering DB 14 which are described in the first to seventh embodiments. In addition, the in-vehicle device 100 functions as a display device including at least a display unit for providing a user with results of route-guidance control performed by the server 102.

In this case, the in-vehicle device 100 basically has only a communication function and a display function, and receives results of route-guidance control performed by the server 102 and provides the user with the results.

Specifically, the server 102 is a route-guidance control device including the destination setting unit 1, the map DB 2, the route search unit 3, the destination's neighboring area setting unit 5, the current-location acquiring unit 6, the inquiry timing decider 7, the inquiry sentence generator 8, the keyword discriminator 10, the destination determination unit 11, the number-of-keyword determination unit 12, the keyword divider 13, and the map rendering DB 14, and the server 102 which is the route-guidance control device allows the in-vehicle device 100 which is the display device to display generated results of route-guidance control.

Even by such a configuration, the same effects as those obtained in the first to seventh embodiments can be obtained.

Note that in addition to the above, the configuration may be such that the server 102 includes only the map DB 2 and the map rendering DB 14, and the in-vehicle device 100 including a route-guidance control device performs a route-guidance control process by communicating with the map DB in the server 102, and displays results of the route-guidance control.

In addition, the case in which the portable information terminal 101 performs a route-guidance control process in cooperation with the server 102, and the in-vehicle device 100 provides the user with results of the route-guidance control will be described.

In this configuration, a case in which the in-vehicle device 100 communicates with the server 102 via the portable information terminal 101 is considered, and an application of the portable information terminal 101 performs a route-guidance control process in cooperation with the server 102. In addition, the in-vehicle device 100 functions as a display device including at least a display unit for providing the user with results of the route-guidance control performed by the portable information terminal 101 and the server 102.

In this case, too, the in-vehicle device 100 basically has only a communication function and a display function, and receives results of route-guidance control performed by the portable information terminal 101 and the server 102 in cooperation with each other, and provides the user with the results.

Specifically, by the application of the portable information terminal 101, results of route-guidance control are displayed on the in-vehicle device 100 which is the display device.

Even by such a configuration, the same effects as those obtained in the first and second embodiments can be obtained.

Note that in this case, too, the configuration may be such that the server 102 includes only the map DB 2 and the map rendering DB 14, and the in-vehicle device 100 including a route-guidance control device performs a route-guidance control process by communicating with the map DB in the server 102 by the application of the portable information terminal 101, and displays results of the route-guidance control.

It is to be understood that, within the scope of the invention, an arbitrary combination of two or more of the above-mentioned embodiments can be made, various changes can be made in an arbitrary component of any one of the above-mentioned embodiments, and an arbitrary component of any one of the above-mentioned embodiments can be omitted.

INDUSTRIAL APPLICABILITY

A route-guidance control device according to the invention can perform a route search by a vague instruction which includes nearly human feelings as if a user tells a taxi driver as to where the user wants to go, even without knowing the location on a map where the user wants to go, or even without the building of area data in advance, and can allow a vehicle to start to run immediately toward the area where the user wants to go. Thus, the route-guidance control device can be applied to a route-guidance control device that sets a destination area by a vague instruction for the route-guidance that is performed by an automotive navigation system or the like, and then provides route-guidance to a final destination as necessary.

REFERENCE SIGNS LIST

1: Destination setting unit, 2: Map DB, 3: Route search unit, 4: Route guidance unit, 5: Destination's neighboring area setting unit, 6: Current-location acquiring unit, 7: Inquiry timing decider, 8: Inquiry sentence generator, 9: Input unit, 10: Keyword discriminator, 11: Destination determination unit, 12: Number-of-keyword determination unit, 13: Keyword divider, 14: Map rendering DB, 100: In-vehicle device, 101: Portable information terminal, and 102: Server.

The invention claimed is:

1. A route-guidance control device comprising:
a processor; and
a memory coupled to the processor, the memory storing instructions which, when executed by the processor, causes the processor to perform a process including accessing to a map database storing map information to search for a destination corresponding to an input linguistic expression, using a plurality of search criteria provided with orders of priority;

setting a first destination corresponding to the input linguistic expression, in accordance with the orders of priority; and setting a range of a neighboring area surrounding the first destination in such manner that the range increases as a distance between a current location and the first destination increases, wherein the process further includes allowing output of an inquiry sentence when the current location and a location of the first destination's neighboring area satisfy a setting condition; and receiving data about a linguistic expression for responding to the inquiry sentence to set a second destination in the first destination's neighboring area, wherein the process further includes deciding whether a linguistic expression input last time is the same as a linguistic expression input this time; and setting a currently set destination to a final destination when the linguistic expression input last time is the same as the linguistic expression input this time.

2. The route-guidance control device according to claim 1, wherein the process further sets a range of the first destination's neighboring area, in accordance with the plurality of search criteria used to set the first destination.

3. The route-guidance control device according to claim 1, wherein the process causes the first destination's neighboring area to be displayed on a display device.

4. The route-guidance control device according to claim 1, wherein the process further includes:

determining a number of words included in the input linguistic expression; and when the input linguistic expression is determined to include a plurality of words, dividing the input linguistic expression into the plurality of words, wherein the first destination is set based on the plurality of words obtained by the division.

5. The route-guidance control device according to claim 1, wherein:

a search criterion of map rendering information is included as one criterion of the plurality of search criteria, the search criterion being used for searching for a destination based on character information to be used for map rendering; and location coordinates of the first destination set based on the search criterion of map rendering information are location coordinates of a center of characters displayed on a map.

6. The route-guidance control device according to claim 1, wherein:

a facility search criterion is included as one criterion of the plurality of search criteria, the facility search criterion being used for searching for a destination based on information on one or more facilities having the input linguistic expression; and location coordinates of the first destination set based on the facility search criterion are set based on a distribution on a map of the one or more facilities.

7. A route-guidance control device comprising:

a processor; and a memory coupled to the processor, the memory storing instructions which, when executed by the processor, causes the processor to perform a process including accessing to a map database storing map information to search for a destination corresponding to an input linguistic expression, using a plurality of search criteria provided with orders of priority;

setting a first destination corresponding to the input linguistic expression, in accordance with the orders of priority; and setting a range of a neighboring area surrounding the first destination in such manner that the range increases as a distance between a current location and the first destination increases, wherein the process further includes allowing output of an inquiry sentence based on an input from an external source; and receiving data about a linguistic expression for responding to the inquiry sentence to set a second destination in the first destination's neighboring area, wherein the process further includes deciding whether a linguistic expression input last time is the same as a linguistic expression input this time; and setting a currently set destination to a final destination when the linguistic expression input last time is the same as the linguistic expression input this time.

8. A route-guidance control device comprising:

a processor; and a memory coupled to the processor, the memory storing instructions which, when executed by the processor, causes the processor to perform a process including accessing to a map database storing map information to search for a destination corresponding to an input linguistic expression, using a plurality of search criteria provided with orders of priority;

setting a first destination corresponding to the input linguistic expression, in accordance with the orders of priority; and setting a range of a neighboring area surrounding the first destination in such manner that the range increases as a distance between a current location and the first destination increases, wherein:

the process searches for destinations that are searchable by the plurality of search criteria, in accordance with the orders of priority; and if a preferential destination exists as a destination being searchable by a search criteria having a high-order of the priority and, in addition, a short-distance destination exists as a destination being searchable by the plurality of search criteria and having a distance from the current location shorter than a distance between the current location and the preferential destination, the process sets the first destination to the short-distance destination when the short-distance destination satisfies a setting condition.

* * * * *